US010256990B2

(12) United States Patent
Yasuda

(10) Patent No.: US 10,256,990 B2
(45) Date of Patent: Apr. 9, 2019

(54) RELAY DEVICE AND RELAY SYSTEM

(71) Applicant: APRESIA Systems, Ltd., Chuo-ku, Tokyo (JP)

(72) Inventor: Makoto Yasuda, Tsuchiura (JP)

(73) Assignee: APRESIA Systems, Ltd., Tokyo (JP)

( * ) Notice: Subject to any disclaimer, the term of this patent is extended or adjusted under 35 U.S.C. 154(b) by 77 days.

(21) Appl. No.: 15/192,059

(22) Filed: Jun. 24, 2016

(65) Prior Publication Data

US 2017/0222830 A1 Aug. 3, 2017

(30) Foreign Application Priority Data

Feb. 2, 2016 (JP) ................................. 2016-018360

(51) Int. Cl.

*H04L 12/437* (2006.01)
*H04L 12/937* (2013.01)
*H04L 12/42* (2006.01)

(52) U.S. Cl.

CPC .......... *H04L 12/437* (2013.01); *H04L 49/253* (2013.01); *H04L 2012/421* (2013.01)

(58) Field of Classification Search

CPC H04L 12/437; H04L 2012/421; H04L 49/253
See application file for complete search history.

(56) References Cited

U.S. PATENT DOCUMENTS

2002/0176355 A1* 11/2002 Mimms .................. H04L 45/02 370/216
2011/0228667 A1* 9/2011 Wang .................... H04L 12/437 370/216
2013/0242722 A1* 9/2013 Meki .................. H04L 41/0659 370/225
2014/0064061 A1* 3/2014 Kulambi ............... H04L 12/437 370/223
2014/0293771 A1 10/2014 Sawaguchi

FOREIGN PATENT DOCUMENTS

JP 2014-195147 A 10/2014

OTHER PUBLICATIONS

ITU-T G.8032/Y.1344 (Feb. 2012), "Ethernet Ring Protection Switching", International Telecommunication Union, pp. 1-96 (104 pages).

* cited by examiner

*Primary Examiner* — Asad M Nawaz
*Assistant Examiner* — Zhaohui Yang
(74) *Attorney, Agent, or Firm* — Crowell & Moring LLP

(57) ABSTRACT

A plurality of management cards including an active card and a standby card are provided. The active card determines open or block of a ring port in accordance with an event based on a ring protocol, issues an open instruction or a block instruction to a line card, and notifies a block factor in addition to the block instruction when issuing the block instruction. The line card controls open or block of the ring port in accordance with the open instruction or the block instruction and retains open/block information of the ring port and a block factor of the block state in a port management table. When the standby card is changed to the active card in accordance with a predetermined change instruction, it acquires the information retained in the port management table from the line card.

12 Claims, 22 Drawing Sheets

FIG. 15

| BLOCK FACTOR | GENERATED FORCED EVENT | RING STATE |
|---|---|---|
| FS | FS COMMAND | Pending→FS |
| SF | local SF | Pending→Protection |
| MS | MS COMMAND | Pending→MS |
| RB | Clear COMMAND | Pending→Idle |

RELAY DEVICE AND RELAY SYSTEM

CROSS-REFERENCE TO RELATED APPLICATION

The present application claims priority from Japanese Patent Application No. 2016-018360 filed on Feb. 2, 2016, the content of which is hereby incorporated by reference into this application.

TECHNICAL FIELD OF THE INVENTION

The present invention relates to a relay device and a relay system, for example, a relay device having a redundancy configuration therein and a relay system to which a ring protocol is applied.

BACKGROUND OF THE INVENTION

For example, Japanese Patent Application Laid-Open Publication No. 2014-195147 (Patent Document 1) describes a scheme in which each of a plurality of line cards receives monitoring frames from two redundant management cards and selects one of these frames to transmit it to an outside of a device in a chassis-type network relay device. Also, ITU-T G.8032/Y.1344 (February 2012) (Non-Patent Document 1) describes a ring protocol of a ring network based on ITU-T G.8032.

SUMMARY OF THE INVENTION

The ring protocol typified by, for example, ITU-T G.8032 described in the Non-Patent Document 1 has been known. Also, as one mode of a relay device (L2 switch) which performs a process of a layer 2 (L2) of an OSI reference model, the chassis-type relay device described in the Patent Document 1 has been known. The chassis-type relay device is provided with a line card which transmits and receives a frame to and from an external device and a management card which manages an entire device including the line card in some cases. When a ring protocol is implemented on the chassis-type relay device like this, the efficiency of the process in the device can be improved by mounting a control unit of the ring protocol mainly in the management card.

Here, it is desirable that a redundancy configuration including a card in an active state and a card in a standby state is applied to the management card as described in the Patent Document 1 in order to improve the fault tolerance. In this case, for example, even when a fault occurs in a card [11] in an active state while the card [1] is executing a ring protocol, a card [2] in a standby state is changed to the active state in place of the card [1], so that the process of the ring protocol can be continuously performed.

Meanwhile, the process of the ring protocol described in the Non-Patent Document 1 is performed based on the shift of the state. For example, when a predetermined event occurs in a ring network, a relay device controls the ring network in accordance with a combination of a current ring state and the event, and makes the shift to a next ring state in accordance with the combination. Here, as one mechanism to transfer the process based on the shift of the state like this from the card [1] to the card [2], the scheme in which the card [1] and the card [2] are synchronized by making the card [1] and the card [2] perform the same operation independently by using the scheme of the Patent Document 1 is conceivable.

In practice, however, there is the difference in timing to perform various processes between the card [1] and the card [2]. As a result, some errors may occur in the process of the ring protocol and there is fear that the fault tolerance as the relay device is degraded. For example, when the card [1] and the card [2] perform the determination process based on individual timings, the determination result may differ in these cards, with the result that the ring states recognized by these cards also differ. If the card [2] is changed to the active state in place of the card [1] in this state, the inconsistency may occur in the process of the ring protocol.

The present invention has been made in view of the problems mentioned above, and one object thereof is to achieve the improvement in the fault tolerance in a relay device and a relay system.

The above and other objects and novel characteristics of the present invention will be apparent from the description of the present specification and the accompanying drawings.

The following is a brief description of an outline of the typical invention disclosed in the present application.

The relay device of the present embodiment includes: a line card having a ring port connected to a ring network; and a plurality of management cards which manage the line card. The plurality of management cards include an active card operating in an active state and a standby card operating in a standby state and changed to the active card in accordance with a predetermined change instruction. The active card determines open or block of the ring port in accordance with an event based on a ring protocol, issues an open instruction or a block instruction of the ring port to the line card, and notifies a block factor representing the event to be a basis of the block instruction in addition to the block instruction when issuing the block instruction. The line card has a port control unit and a port management table. The port control unit controls open and block of the ring port in accordance with the open instruction and the block instruction from the active card, and the port management table retains open/block information of the ring port and the block factor notified from the active card. The standby card acquires information retained in the port management table from the line card when it is changed to the active card in accordance with the predetermined change instruction.

The advantages obtained by representative embodiments in the present invention disclosed in the present application will be briefly described as follows. That is, it is possible to achieve the improvement in the fault tolerance.

BRIEF DESCRIPTIONS OF THE DRAWINGS

FIG. 15 is a supplementary view for describing a part of the process contents of FIG. 14;

DESCRIPTIONS OF THE PREFERRED EMBODIMENTS

Figure 1:
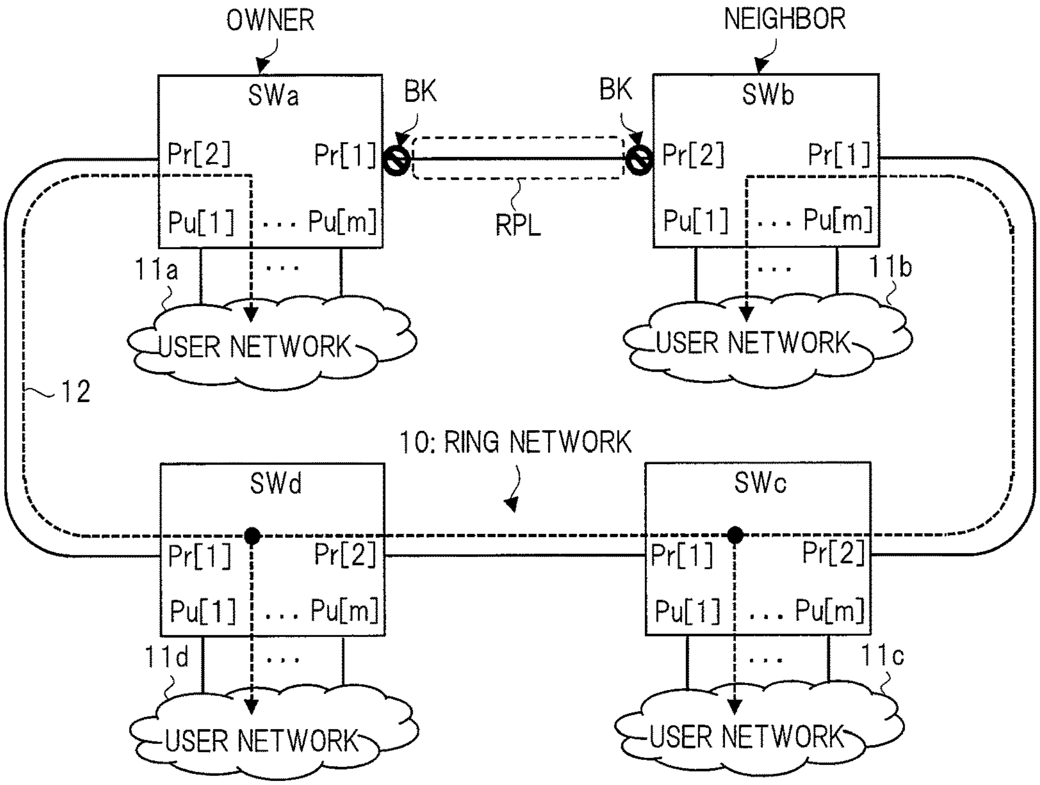
FIG. 1 is a schematic view showing a configuration example of a relay system and an operation example in the absence of fault according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specific number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

<<Schematic Configuration of Relay Device and Schematic Operation in Absence of Fault>>

FIG. 1 is a schematic view showing a configuration example of a relay system and an operation example in the absence of fault according to the first embodiment of the present invention. The relay system shown in FIG. 1 includes a plurality of (here, four) relay devices SWa to SWd constituting a ring network 10. Each of the relay devices SWa to SWd is referred to also as a node. Each of the relay devices SWa to SWd has two ring ports Pr[1] and Pr[2] and m (m is an integer of 1 or more) user ports Pu[1] to Pu[m]. The number of relay devices constituting the ring network 10 is four in this example, but is not limited thereto and may be any number as long as it is two or larger.

The ring network 10 is controlled based on, for example, a ring protocol defined by ITU-T G.8032. In other words, each of the relay devices SWa to SWd is provided with various control functions based on the ring protocol. Each of the relay devices SWa to SWd is an L2 switch which performs the relay process of a layer 2 (L2) of an OSI reference model or may be an L3 switch which performs the relay process of a layer 3 (L3). However, since the relay process on the ring network 10 is performed based on the L2, the case where each of the relay devices SWa to SWd is the L2 switch is taken as an example here.

The two ring ports Pr[1] and Pr[2] are each connected to the ring network 10. In other words, each of the relay devices SWa to SWd is connected via the ring ports Pr[1] and Pr[2] in a ring shape, so that the ring network 10 is formed. In the example of FIG. 1, the ring ports Pr[1] of the relay devices SWa, SWb, SWc and SWd are connected to the ring ports Pr[2] of the adjacent relay devices SWb, SWc, SWd and SWa via a communication line, respectively.

The user ports Pu[1] to Pu[m] are connected to predetermined user networks. In the example of FIG. 1, the user ports Pu[1] to Pu[m] of the relay devices SWa to SWd are connected to user networks 11*a* to 11*d*, respectively. In each of the user networks 11*a* to 11*d*, relay devices, various information processing devices (server device, terminal device and others) and others are arranged as appropriate.

Here, based on ITU-T G.8032, the relay device SWa is set as an owner node, and the relay device SWb is set as a neighbor node. A link between the owner node and the neighbor node is referred to as RPL (Ring Protection Link). When there is no fault on the ring network 10, the relay device SWa controls the ring port Pr[1] located at one end of the RPL to a block state BK, and the relay device SWb controls the ring port Pr[2] located at the other end of the RPL to the block state BK.

The ring port in the block state BK blocks frames from passing through it. When there is no fault on the ring network 10, this RPL prevents the loop path of the frame on the ring network 10. Thus, as shown in FIG. 1, a communication path 12 via the relay devices SWd and SWc is formed between the relay device SWa and the relay device SWb. Frame transfer between the user networks 11*a* to 11*d* is performed on this communication path 12.

<<Fault Monitoring Method of Relay System>>

Figure 2:
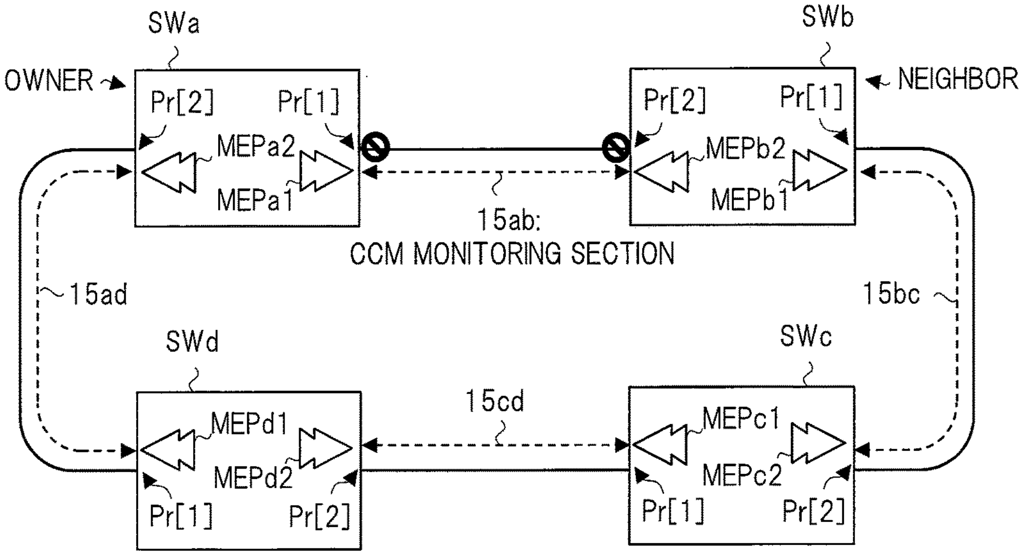
FIG. 2 is a schematic view showing an example of a fault monitoring method in the relay system of FIG. 1.

FIG. 2 is a schematic view showing an example of a fault monitoring method in the relay system of FIG. 1. As shown in FIG. 2, the relay devices SWa to SWd are provided with monitoring points MEPa1 to MEPd1 corresponding to the ring ports Pr [1] and monitoring points MEPa2 to MEPd2 corresponding to the ring ports Pr[2], respectively.

ITU-T G.8032 defines that a CC (Continuity check) function of Ethernet (registered trademark) OAM is used for monitoring presence or absence of fault in a link between the relay devices. Ethernet OAM has been standardized by "ITU-T Y.1731" and "IEEE802.1ag", etc. as a standard for monitoring the continuity between devices. In the CC function, a monitoring section is set by monitoring points referred to as MEP (Maintenance End Point) as shown in FIG. 2. MEPs at both ends of each monitoring section monitor the continuity of each monitoring section by transmitting and receiving a CCM (Continuity Check Message) frame, which is a continuity monitoring frame, between each other at regular intervals.

In the example of FIG. 2, the monitoring point MEPa1 of the relay device SWa sets a CCM monitoring section 15*ab* between itself and the monitoring point MEPb2 of a different device (SWb), thereby monitoring the continuity between the ring port Pr[1] of its own device and the ring port Pr[2] of the different device (SWb) connected thereto. Meanwhile, the monitoring point MEPb2 of the relay device SWb also sets the CCM monitoring section 15*ab* between itself and the monitoring point MEPa1 of a different device (SWa), thereby monitoring the continuity between the ring port Pr[2] of its own device and the ring port Pr[1] of the different device (SWa) connected thereto.

Similarly, the CCM monitoring sections 15*bc*, 15*cd* and 15*ad* are sequentially set on the ring network 10. In each CCM monitoring section (for example, 15*ab*), the monitoring point of one end (MEPa1) recognizes the continuity with respect to the monitoring point of the other end (MEPb2) as an LOC (Loss Of Continuity) state when it does not receive a CCM frame from the monitoring point of the other end (MEPb2) within a predetermined period. This predetermined period is, for example, 3.5 times as long as a transmission interval of the CCM frame (typically, 3.3 ms).

When the LOC state is recognized, the monitoring point of one end (MEPa1) transmits the CCM frame having a flag attached to an RDI (Remote Defect Indication) bit when transmitting the CCM frame to the monitoring point of the other end (MEPb2). The monitoring point of the other end (MEPb2) recognizes the continuity with respect to the monitoring point of one end (MEPa1) as an RDI state by receiving the CCM frame having the flag attached to the RDI bit from the monitoring point of one end (MEPa1). Each of the relay devices SWa to SWd determines presence or absence of fault at the ring ports Pr[1] and Pr[2] of its own device (including the link connected thereto) based on presence or absence of the LOC state or the RDI state in the monitoring points (MEP) of its own device.

<<Operation of Relay System in Occurrence of Fault>>

Figure 3:
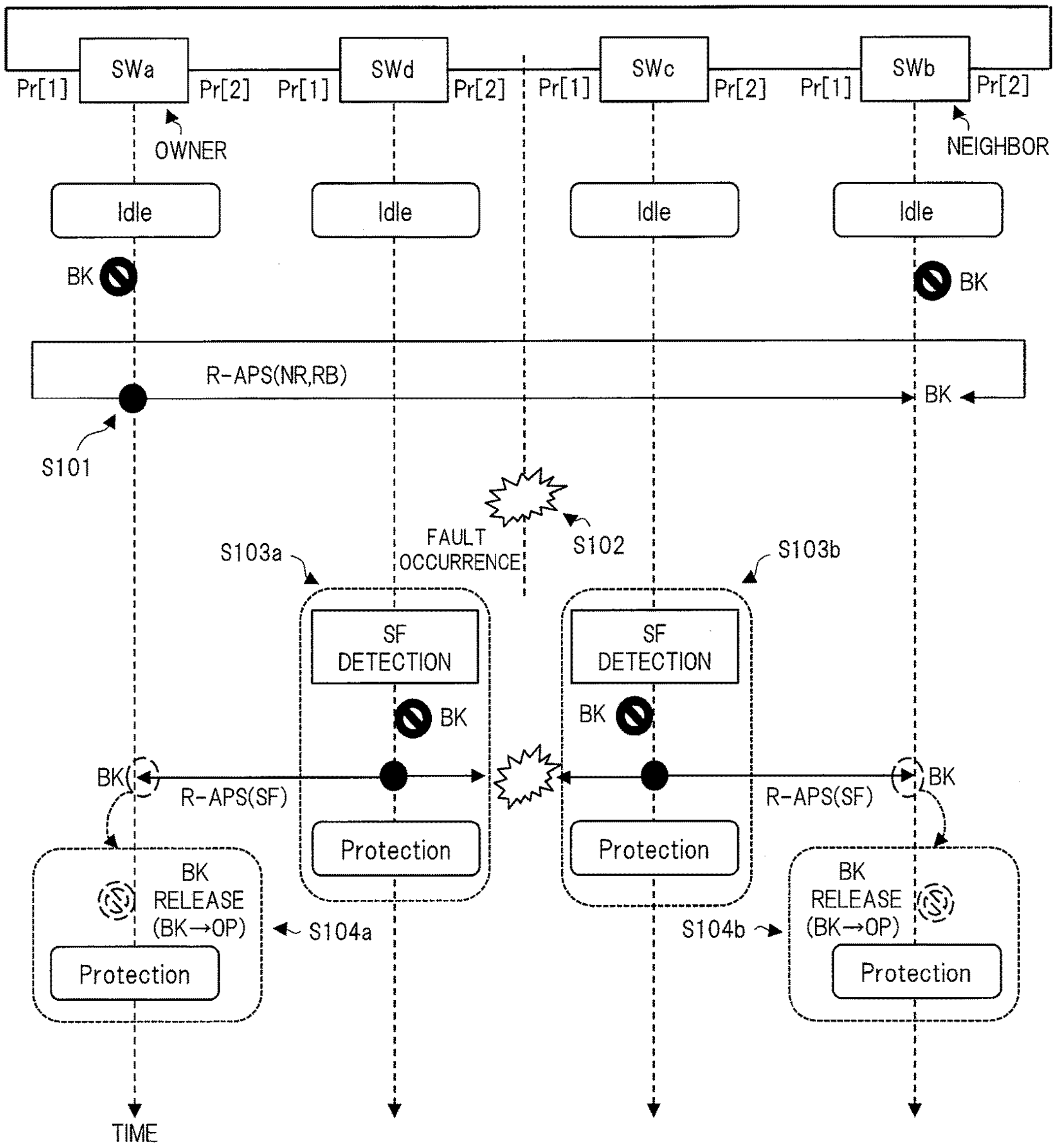
FIG. 3 is a diagram showing an example of a main operation sequence in the occurrence of fault (SF) in the relay system of FIG. 1.

FIG. 3 is a diagram showing an example of a main operation sequence in the occurrence of fault (SF) in the relay system of FIG. 1. In FIG. 3, as a state before the occurrence of fault (step S102), the ring port Pr[1] of the relay device SWa serving as an owner node and the ring port Pr[2] of the relay device SWb serving as a neighbor node are both controlled to the block state BK. Also, in all of the relay devices SWa to SWd, the ring state based on the ring protocol is an idle state. The idle state generally indicates that a special event typified by a fault or the like does not occur in particular.

In this state, the relay device SWa serving as an owner node transmits an R-APS (NR, RB) frame defined by ITU-T G.8032 to the ring network 10 at regular intervals (for example, every 5 s) (Step S101). NR (No Request) denotes absence of request and RB (RPL Blocked) denotes the block of RPL. The R-APS (NR, RB) frame notifies the other relay devices SWb to SWd that the ring network 10 has no fault and the RPL (that is, the ring port Pr[1] of the relay device SWa) is thus controlled to the block state BK.

The case where a fault occurs in a link between the relay device SWc and the relay device SWd in this state as shown by the step S102 is assumed. In this case, as shown by the step S103*b*, the relay device SWc detects the occurrence of fault (SF (Signal Fail) of ITU-T G.8032) of the ring port Pr[1] (including the link connected thereto) based on a monitoring result at the monitoring point MEPc1 shown in FIG. 2. In accordance with this, the relay device SWc controls the ring port Pr[1] to the block state BK, transmits the R-APS (SF) frame from the ring ports Pr[1] and Pr[2], and shifts the ring state from the idle state to a protection state.

The R-APS (SF) frame functions as a fault notification frame. The protection state generally indicates that a fault occurs on the ring network 10. Also, as shown by a step S103*a*, the relay device SWd also performs the same process as the relay device SWc. The R-APS (SF) frames transmitted by the relay devices SWc and SWd are relayed by the respective relay devices until reaching a ring port in the block state BK.

Here, as shown by a step S104*a*, when the relay device SWa serving as an owner node has received the R-APS (SF) frame in the idle state, it releases the block state BK of the ring port Pr[1] (that is, changes the state to an open state OP). The ring port in the open state OP permits the passage of the frame. Also, when the relay device SWa has received the R-APS (SF) frame in the idle state, it shifts the ring state from the idle state to the protection state. Also, as shown by a step S104*b*, the relay device SWb serving as a neighbor node also performs the same process as the case of the relay device SWa.

As described above, various types of R-APS frames function as control frames to control the ring network. Though not illustrated, in practice, the various types of R-APS frames are first transmitted three times every 3.3 ms, and are thereafter transmitted every 5 s. In the step S104*a*, in more details, when the relay device SWa has received the R-APS (SF) frame in the idle state, it stops the transmission of the R-APS (NR, RB) frame and flushes the FDB (Forwarding DataBase). As described above, each of the relay devices SWa to SWd performs various processes including the FDB flushing and the stop of the R-APS frame in accordance with the combination of various ring states and various events. However, the description of these processes is omitted for the sake of simplicity and major processes will only be described in this specification.

<<Operation of Relay System in Recovery from Fault (Clearing of SF)>>

Figure 4:
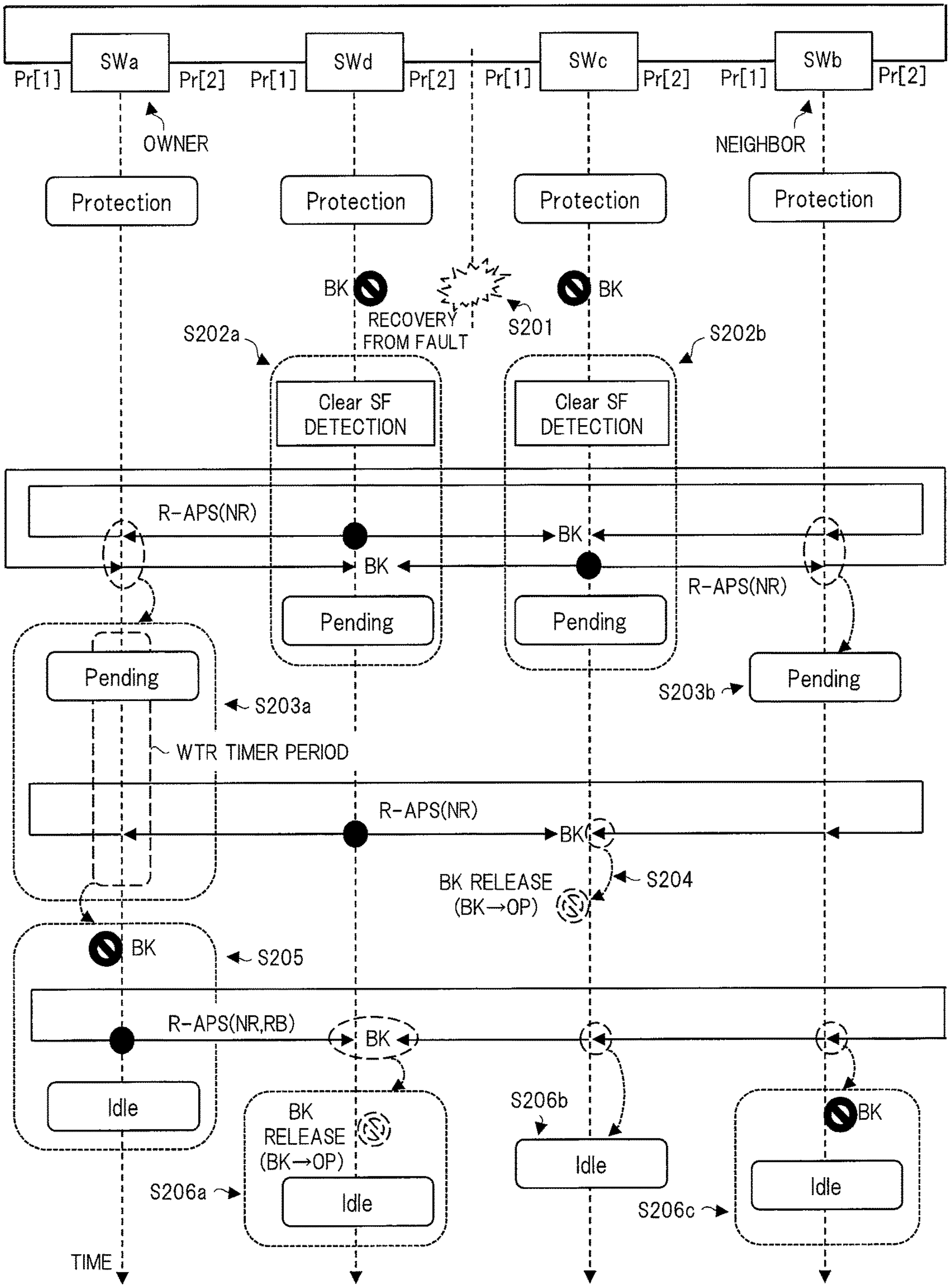
FIG. 4 is a diagram showing an example of a main operation sequence in the recovery from fault (clearing of SF) in the relay system of FIG. 1.

FIG. 4 is a diagram showing an example of a main operation sequence in the recovery from fault (clearing of SF) in the relay system of FIG. 1. The case where a fault occurs in the link between the relay device SWc and the relay device SWd as shown in FIG. 3 and the fault is recovered is assumed in FIG. 4. First, in the state where a fault occurs, the ring port Pr[1] of the relay device SWc and the ring port Pr[2] of the relay device SWd are both controlled to the block state BK. Also, in all of the relay devices SWa to SWd, the ring state is the idle state as shown in FIG. 3. When the fault is recovered in this state (step S201), the process as follows is performed.

As shown by a step S202*b*, the relay device SWc detects the recovery from fault (Clear SF in ITU-T G.8032) of the ring port Pr[1] by using the monitoring point MEPc1. Then, the relay device SWc transmits the R-APS (NR) frame from the ring ports Pr[1] and Pr[2] and shifts the ring state from the protection state to a pending state. The R-APS (NR) frame functions as a fault recovery frame. The pending state generally indicates that the state of the ring network 10 is not clearly determined. Also, as shown by a step S202*a*, the relay device SWd also performs the same process as the relay device SWc.

As shown by a step S203*a*, when the relay device SWa serving as an owner node has received the R-APS (NR) frame in the protection state, it starts the WTR (Wait to Restore) timer and shifts the ring state from the protection state to the pending state. Also, as shown by a step S203*b*, when the relay device SWb serving as a neighbor node has received the R-APS (NR) frame in the protection state, it shifts the ring state from the protection state to the pending state.

Meanwhile, as shown by a step S204, each of the relay devices SWc and SWd receives the R-APS (NR) frame from the other within a period of a guard timer (not shown), and determines whether to change the ring port of its own device in the block state BK to the open state OP based on the information of priority contained in the R-APS (NR) frame. In this example, the block state BK of the ring port Pr[1] of the relay device SWc is released based on the determination result like this.

In a step S205, when the period of the WTR timer finishes in the pending state, the relay device SWa changes the RPL (that is, ring port Pr[1]) from the open state OP to the block state BK. In addition, the relay device SWa transmits the R-APS (NR, NB) frame from the ring ports Pr[1] and Pr[2] and shifts the ring state from the pending state to the idle state.

In a step S206*a*, when the relay device SWd has received the R-APS (NR, RB) frame in the pending state, it releases the block state BK of the ring port Pr[2] and shifts the ring state from the pending state to the idle state. Also, in a step S206*b*, when the relay device SWc has received the R-APS (NR, RB) frame in the pending state, it shifts the ring state from the pending state to the idle state.

Meanwhile, in a step S206*c*, when the relay device SWb serving as a neighbor node has received the R-APS (NR, RB) frame in the pending state, it changes the RPL (that is, ring port Pr[2]) from the open state OP to the block state BK and shifts the ring state from the pending state to the idle state. As a result of the process described above, the normal state shown in FIG. 1 and the step S101 of FIG. 3 is recovered.

As described above, the process of the ring protocol based on the ITU-T G.8032 is performed based on the shift of the state. As a supplement, first, an FS (Forced Switch) state and an MS (Manual Switch) state are defined as the ring state in addition to the idle state, the protection state and the pending state shown in FIG. 3 and FIG. 4. Then, which control is to be performed, what is output next and which state the ring state shifts to next are defined in accordance with the combination of the ring state and the event. The event includes, for example, a local event which directly occurs in its own device like the SF detection shown by the step S103*a* of FIG. 3 and a remote event notified by a different device through the R-APS frame generated in the different device like that shown by the step S104*a* of FIG. 3.

In this case, the FS state generally indicates that a blocked port based on an FS command is present on the ring network 10. Specifically, a user can input an FS command containing the information of the ring port which the user wants to block to a predetermined relay device. In accordance with this local event, the corresponding relay device forcibly controls the ring port specified by the FS command to the block state BK, and transmits the R-APS (FS) frame to a different device and shifts the ring state to the FS state. Also, the different device which has received the R-APS (FS) frame shifts the ring state to the FS state in accordance with the remote event.

Meanwhile, when the user wants to release the FS state, the user inputs a clear command to the relay device in which the blocked port based on the FS command is present. In accordance with this local event, the corresponding relay device transmits the R-APS (NR) frame to the different device and shifts the ring state to the pending state in the same manner as the case of the step S202*a* of FIG. 4. Subsequently, each relay device clears the FS state through approximately the same process as that of the clearing of SF shown in FIG. 4, and returns to the idle state in which the RPL is blocked.

The MS state generally indicates that a blocked port based on an MS command is present on the ring network 10 like the case of the FS state. However, the priority of the MS state is lower than those of the FS state and the protection state. For example, when the SF is detected at a predetermined ring port in the MS state, the ring state is shifted to the protection state and the blocked port based on the MS command is released, and the ring port at which the SF is detected is blocked instead. Meanwhile, the FS state has the highest priority. For example, even when the SF is detected at a predetermined ring port in the FS state, the ring state remains in the FS state and the blocked port based on the FS command keeps the block state, and the ring port at which the SF is detected is not blocked. The shift from the FS state to other ring states is executed only when the clear command is generated as described above.

<<Configuration of Relay Device>>

Figure 5:
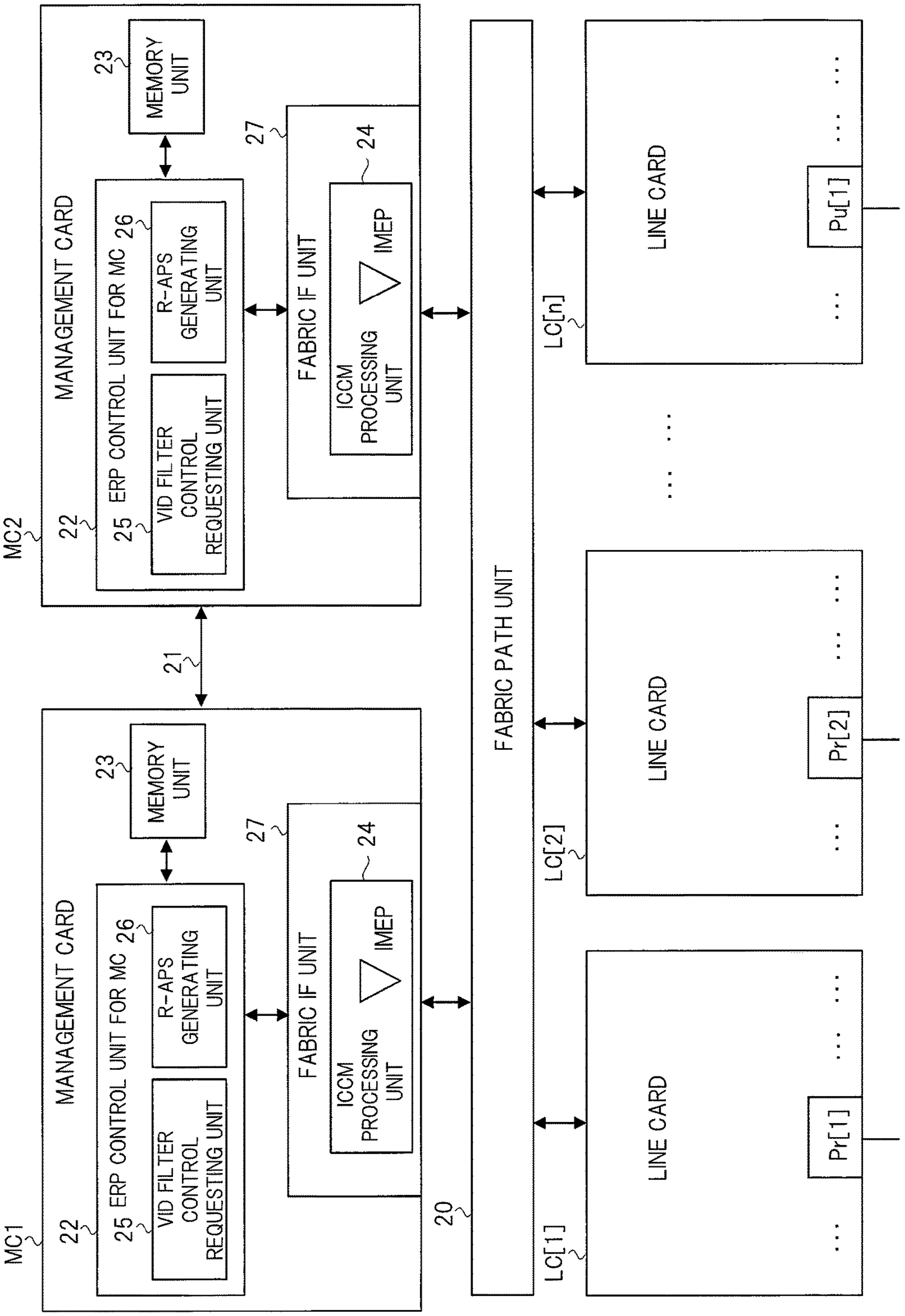
FIG. 5 is a block diagram showing a schematic configuration example of a main part of a relay device in the relay system of FIG. 1.
Figure 6:
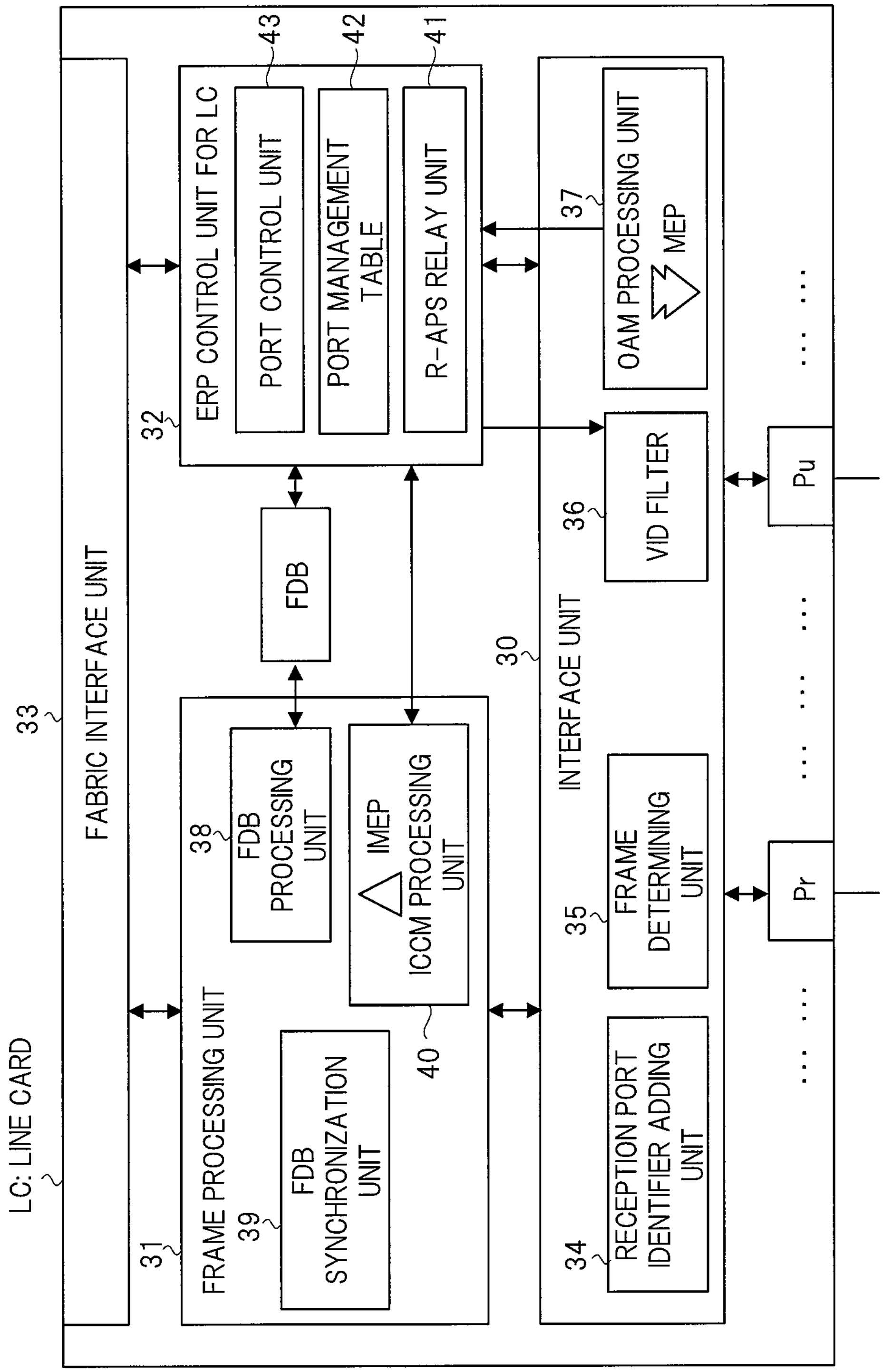
FIG. 6 is a block diagram showing a schematic configuration example of a main part of each line card in FIG. 5.

FIG. 5 is a block diagram showing a schematic configuration example of a main part of a relay device in the relay system of FIG. 1. FIG. 6 is a block diagram showing a schematic configuration example of a main part of each line card in FIG. 5. The relay device shown in FIG. 5 is applied to at least one of the relay devices SWa to SWd shown in FIG. 1.

The relay device shown in FIG. 5 is a chassis-type relay device having a plurality of cards mounted in one chassis. The relay device includes a plurality of (here, n) line cards LC[1] to LC[n], a plurality of (here, two) management cards MC1 and MC2 and a fabric path unit 20. Each of the line cards LC[1] to LC[n] communicates (transmits and receives) frames with external devices. The fabric path unit 20 mediates the communication between the plurality of line cards LC[1] to LC[n] and mediates also the communication between each of the plurality of management cards MC1 and MC2 and each of the plurality of line cards LC[1] to LC[n]. Specifically, the fabric path unit 20 is configured of wires in a mesh fashion or configured of a fabric card.

Though not illustrated, each of the management cards MC1 and MC2 has a general management function to manage various settings and states of the plurality of line cards LC[1] to LC[n] based on instructions from a device manager and others. Each of the management cards MC1 and MC2 includes an ERP control unit 22 for MC, a memory unit 23 and a fabric interface unit 27 in addition to the general management function described above. The ERP control unit 22 for MC functions as a ring control unit and mainly performs various processes based on a predetermined ring protocol (here, ITU-T G.8032) while using the information of the memory unit 23. Though details thereof will be described later, the ERP control unit 22 for MC has a VID filter control requesting unit 25 and an R-APS generating unit 26.

The fabric interface unit 27 has an ICCM processing unit 24 and mediates the communication between its own management card and the fabric path unit 20. The ICCM processing unit 24 communicates an internal continuity monitoring frame (hereinafter, referred to as ICCM frame) with each of the plurality of line cards LC[1] to LC[n], thereby monitoring the presence or absence of continuity with each of the plurality of line cards. Further, the ICCM processing unit 24 mediates the communication between the ERP control unit 22 for MC and each of the plurality of line cards by using the ICCM frame.

Here, the plurality of management cards MC1 and MC2 include an active card which operates in an active state (ACT) and a standby card which operates in a standby state (SBY) and changes to the active card in accordance with a predetermined change instruction (specifically, active change described later). For example, the management card MC1 is the active card and the management card MC2 is the standby card. In addition, the management cards MC1 and MC2 have a communication path (for example, communication line) 21 for the communication therebetween.

The plurality of line cards LC[1] to LC[n] have the ring ports Pr[1] and Pr[2] and the user ports Pu[1] to Pu[m] shown in FIG. 1 and others. In the example of FIG. 5, the line card LC[1] has the ring port Pr[1], the line card LC[2] has the ring port Pr[2] and the line card LC[n] has the user port Pu[1]. However, which line cards the ports are provided in is not limited to the example of FIG. 5, and can be arbitrarily set.

Each of the plurality of line cards LC[1] to LC[n] has the configuration shown in FIG. 6 in detail. The line card LC of FIG. 6 includes an interface unit 30, a frame processing unit 31, an FDB, an ERP control unit 32 for LC and a fabric interface unit 33. Here, for convenience of description, the line card LC is provided with a plurality of ports including the ring port Pr and the user port Pu.

The interface unit 30 includes a reception port identifier adding unit 34, a frame determining unit 35, a VID filter 36 and an OAM processing unit 37, and mainly transmits and receives a frame to and from the plurality of ports. When a frame is received at any of the plurality of ports, the reception port identifier adding unit 34 adds a reception port identifier representing the reception port to the frame. The frame determining unit 35 determines a format of a frame, that is, determines whether the format of the received frame is a format of a user frame or a format of an R-APS frame.

The VID filter 36 controls whether to permit the passage of a frame based on the set condition. For example, the condition that when a frame having a predetermined VLAN identifier VID is received at a predetermined port, the frame is discarded and the condition that when a frame having a predetermined VLAN identifier VID is transmitted from a predetermined port, the frame is discarded without transmitting it are set. The VID filter 36 performs the process based on the conditions. The actual block state BK and open state OP of the ring port are established by the VID filter 36.

The OAM processing unit 37 has the MEP shown in FIG. 2 and communicates a continuity monitoring frame (specifically, CCM frame) with external devices through the ring port Pr, thereby monitoring the presence or absence of fault at the ring port Pr. When the received frame is a user frame, the interface unit 30 transmits the frame to the frame processing unit 31, and when the received frame is an R-APS frame, it transmits the frame to the ERP control unit 32 for LC. In addition, when the interface unit 30 has received a frame to which a destination port identifier representing a destination port of the frame is added from the frame processing unit 31 or the ERP control unit 32 for LC, it transmits the frame to the destination port.

The FDB retains a correspondence relation among a MAC (Media Access Control) address, a VLAN identifier VID and a port. Further, the FDB additionally retains a ring ID when the port is a ring port. The ring ID is used as a key when an entry to be a target of the FDB flush is determined. The frame processing unit 31 includes an FDB processing unit 38, an FDB synchronization unit 39 and an ICCM processing unit 40. The FDB processing unit 38 performs learning and retrieval on the FDB when the user frame is received at a port. Specifically, the FDB processing unit 38 learns a source MAC address of a received user frame to the FDB so as to be associated with the VLAN identifier VID and the reception port identifier (including the identifier of the line card) added in the interface unit 30.

Further, the FDB processing unit 38 retrieves the FDB by using the destination MAC address of the received user frame and the VLAN identifier VID as search keys, thereby acquiring the destination port identifier (including the identifier of the line card). When the destination port identifier is the port identifier of its own line card, the FDB processing unit 38 directly transmits the user frame having the destination port identifier added thereto to the interface unit 30 or transmits it to the interface unit 30 by way of turning it at the fabric interface unit 33 or the fabric path unit 20. Meanwhile, when the destination port identifier is the port identifier of a different line card, the FDB processing unit 38 transmits the user frame having the destination port identifier added thereto to the fabric path unit 20 through the fabric interface unit 33. The fabric path unit 20 transmits the user frame to the line card based on the destination port identifier.

The FDB synchronization unit 39 has a function to synchronize the contents retained in the FDBs of the plurality of line cards LC[1] to LC[n]. Specifically, when the FDB synchronization unit 39 has received a frame at a port of its own line card, it generates a learning frame containing the reception port identifier and a header part of the frame, and transmits it to a different line card through the fabric path unit 20. The FDB synchronization unit 39 of the different line card learns the FDB based on the learning frame.

The ICCM processing unit 40 communicates the ICCM frame with each of the management cards MC1 and MC2, thereby monitoring the presence or absence of continuity with each of the management cards MC1 and MC2. Further, the ICCM processing unit 40 mediates the communication between the ERP control unit 32 for LC and each of the management cards MC1 and MC2 by using the ICCM frame.

The ERP control unit 32 for LC functions as a ring control unit, and subordinately performs various processes based on a predetermined ring protocol (here, ITU-T G.8032) under the ERP control unit 22 for MC. The ERP control unit 32 for LC includes an R-APS relay unit 41, a port management table 42 and a port control unit 43. The R-APS relay unit 41 relays the R-APS frame received at the ring port Pr to the management cards MC1 and MC2 through the fabric interface unit 33. Also, the R-APS relay unit 41 relays the R-APS frame received at one of the two ring ports to the other of the two ring ports.

The port management table 42 retains the open/block information of the ring port and the block factor in the case where the ring port is in the block state. The port control unit 43 controls the open and block of the ring port Pr in accordance with the open instruction or the block instruction from the active card. Note that details of the port management table 42 and the port control unit 43 will be described later.

The fabric interface unit 33 transmits the frames (user frame, ICCM frame and learning frame) transmitted from the frame processing unit 31 and the R-APS frame relayed by the R-APS relay unit 41 to the fabric path unit 20. In addition, the fabric interface unit 33 transmits the frame from the fabric path unit 20 to the frame processing unit 31 or the ERP control unit 32 for LC.

In the management cards MC1 and MC2 of FIG. 5, the ERP control unit 22 for MC is realized by program process by a processor (CPU) or the like, the memory unit 23 is realized by a RAM or the like, and the fabric interface unit 27 is mounted in FPGA (Field Programmable Gate Array) or the like. Further, in the line card LC of FIG. 6, each of the interface unit 30 and the fabric interface unit 33 are mounted in ASIC (Application Specific Integrated Circuit) or the like, and the frame processing unit 31 and the ERP control unit 32 for LC are mounted in FPGA or the like. The FDB is mounted in CAM (Content Addressable Memory) or the like. However, a specific mounting form of each unit is of course not limited thereto, and each unit may be mounted by hardware, software, or the combination thereof as needed.

<<Internal Continuity Monitoring Operation and Active Change Operation of Relay Device>>

Figure 7:
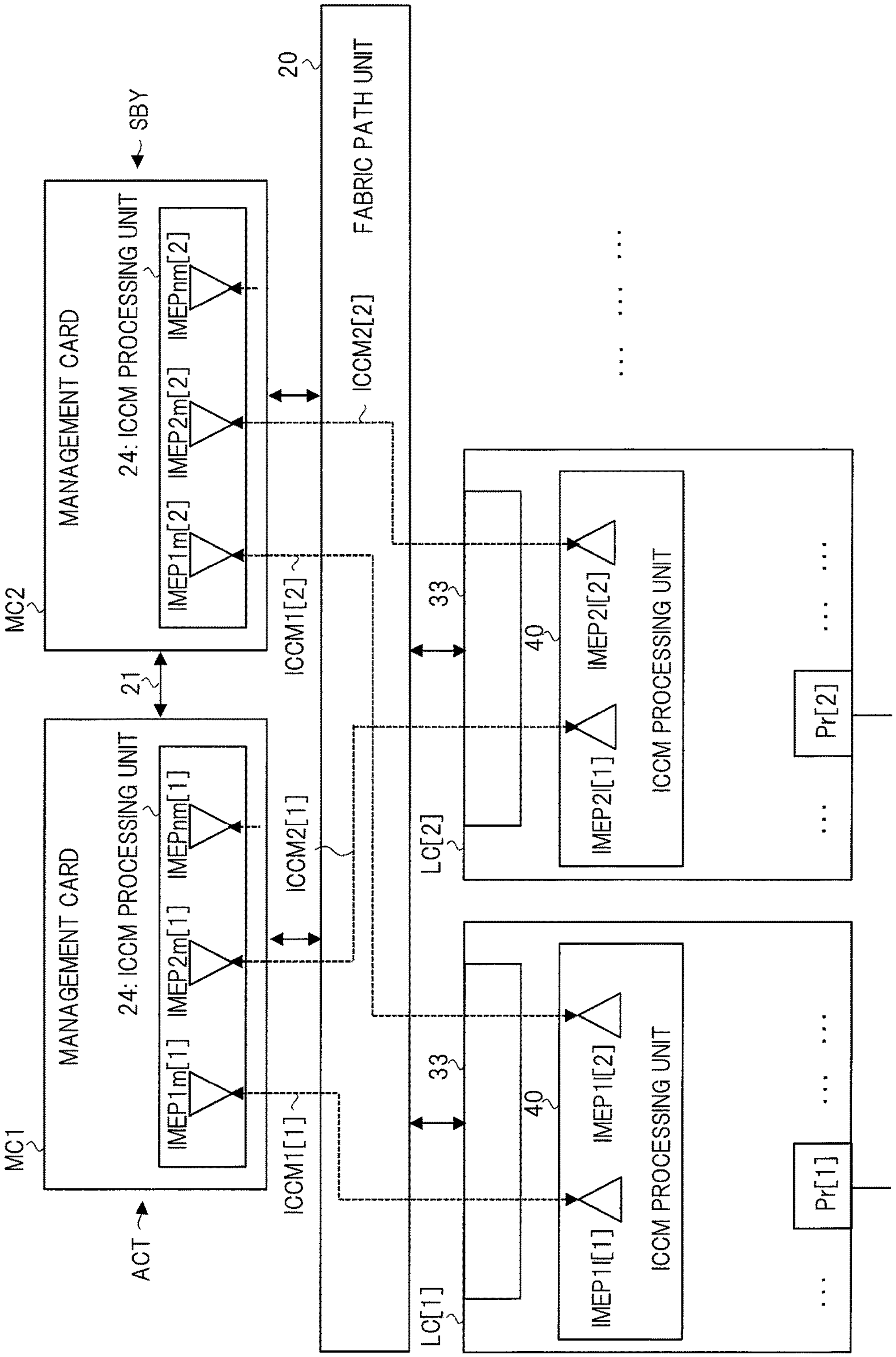
FIG. 7 is an explanatory view showing an example of process contents of an ICCM processing unit in the relay device of FIG. 5 and FIG. 6.

FIG. 7 is an explanatory view showing an example of process contents of the ICCM processing unit in the relay device of FIG. 5 and FIG. 6. In FIG. 7, the ICCM processing unit 40 of the line card LC[1] has an internal monitoring point IMEP11[1] for the management card MC1 and an internal monitoring point IMEP11[2] for the management card MC2. Similarly, the ICCM processing unit 40 of the line card LC[2] has an internal monitoring point IMEP21[1] for the management card MC1 and an internal monitoring point IMEP21[2] for the management card MC2.

Though not illustrated, the ICCM processing unit 40 of each of the line cards (for example, LC[n]) similarly has an internal monitoring point (IMEPn1[1]) for the management card MC1 and an internal monitoring point (IMEPn1[2]) for the management card MC2. Meanwhile, the ICCM processing unit 24 of the management card MC1 has internal monitoring points IMEP1*m*[1], IMEP2*m*[I], . . . and IMEPnm[1]. The ICCM processing unit 24 of the management card MC2 has internal monitoring points IMEP1*m*[2], IMEP2*m*[2], . . . and IMEPnm[2].

Each of the internal monitoring points IMEP1*m*[1], IMEP2*m*[1], . . . of the management card MC1 monitors the internal continuity by transmitting and receiving the ICCM frames ICCM1[1], ICCM2[1], . . . to and from the internal monitoring points IMEP11[1], IMEP21[1], . . . for the management card MC1 in the plurality of line cards. Similarly, each of the internal monitoring points IMEP1*m*[2], IMEP2*m*[2], . . . of the management card MC2 monitors the internal continuity by transmitting and receiving the ICCM frames ICCM1[2], ICCM2[2], . . . to and from the internal monitoring points IMEP11[2], IMEP21[2], . . . for the management card MC2 in the plurality of line cards.

The ICCM frame is an internal continuity monitoring frame and is a frame similar to the CCM frame functioning as a continuity monitoring frame described above. Namely, in the first embodiment, the standard of the Ethernet OAM to monitor the continuity between devices is utilized and the scheme similar to this is applied to the monitoring of the continuity inside the device. Then, the ICCM frame is used as the monitoring frame to monitor the continuity inside the device instead of the CCM frame. When the internal continuity is monitored by using the ICCM frame, the presence or absence of internal continuity (presence or absence of fault) is determined based on the presence or absence of the LOC state and the RDI state in the same manner as the case of the CCM frame described above.

Though not necessarily limited, the transmission interval of the ICCM frame is desirably equal to or shorter than the transmission interval of the CCM frame. In the first embodiment, for example, the transmission interval of the ICCM frame is 1 ms or the like and the transmission interval of the CCM frame is 3.5 ms or the like.

Here, in the example of FIG. 7, the management card MC1 operates in the active state ACT (namely, is the active card), and the management card MC2 operates in the standby state SBY (namely, is the standby card). For example, the case where a fault occurs in a communication path between the line card LC[1] and the management card MC1 in this state is assumed. In this case, the line card LC[1] and the management card MC1 both can detect the occurrence of fault based on the LOC state or the RDI state of the ICCM frame ICCM1[1].

When the occurrence of fault is detected, for example, the line card LC[1] performs the active change to its own line card, and thereafter the management card MC2 is regarded as the active card instead of the management card MC1. In response to the detection of the occurrence of fault, the management card MC1 notifies the management card MC2 and the other line cards LC[2] . . . that the active change is to be performed. In accordance with this, the management card MC2 changes itself from the standby state SBY to the active state ACT, and the other line cards LC[2] . . . also perform the active change to their own line cards in the same manner as the case of line card LC[1]. Note that the management card MC1 changes to the standby state SBY from the active state ACT after the notification of the active change.

Furthermore, for example, the case where a fault occurs in the management card MC1 itself is assumed. In this case, each of the line cards LC[1], LC[2], . . . can detect the occurrence of fault based on the LOC state of the ICCM frames ICCM1[1], ICCM2[1], . . . . In accordance with this, each of the line cards LC[1], LC[2], performs the active change to its own line card, and thereafter the management card MC2 is regarded as the active card instead of the management card MC1. Meanwhile, the management card MC2 also can detect the occurrence of fault by the monitoring of the management card MC1 by the use of the communication path 21 or the like. In accordance with this, the management card MC2 itself changes from the standby state SBY to the active state ACT.

Note that the active change can be performed in various ways other than that described as an example above. Further, although the active change in the case of the presence of fault has been described here, the active change can be performed also by the input of the active change command from the user even in the case of the absence of fault. In this case, for example, the management card MC1 simply accepts the active change command and notifies the management card MC2 and the line cards LC[1], LC[2], . . . that the active change is to be performed.

<<Ring Protocol Operation of Relay Device in Detection of Fault Occurrence (Premise)>>

Figure 8:
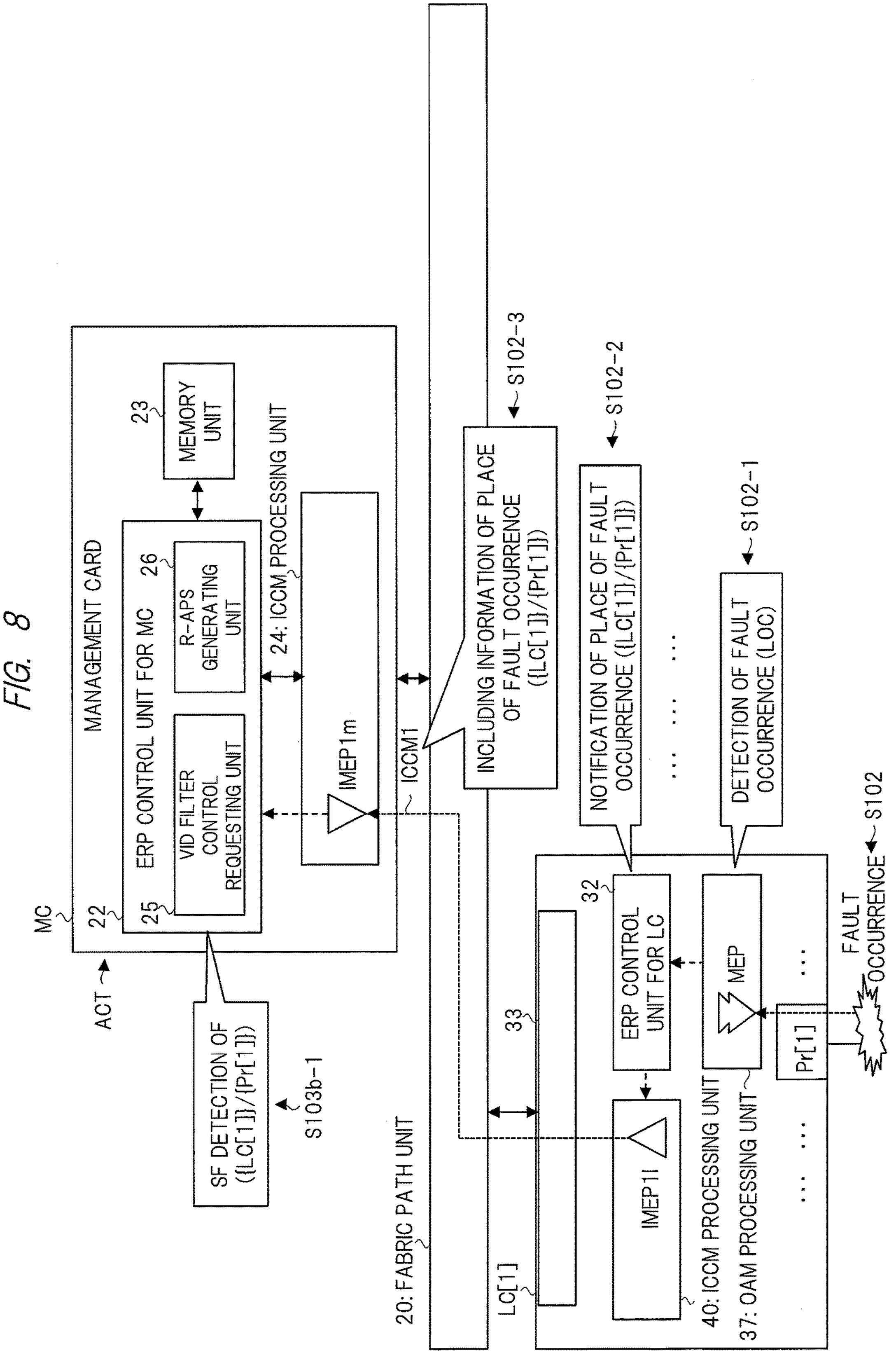
FIG. 8 is an explanatory view showing an example of a ring protocol operation in the detection of fault occurrence to be a premise in the relay device of FIG. 5 and FIG. 6.
Figure 9:
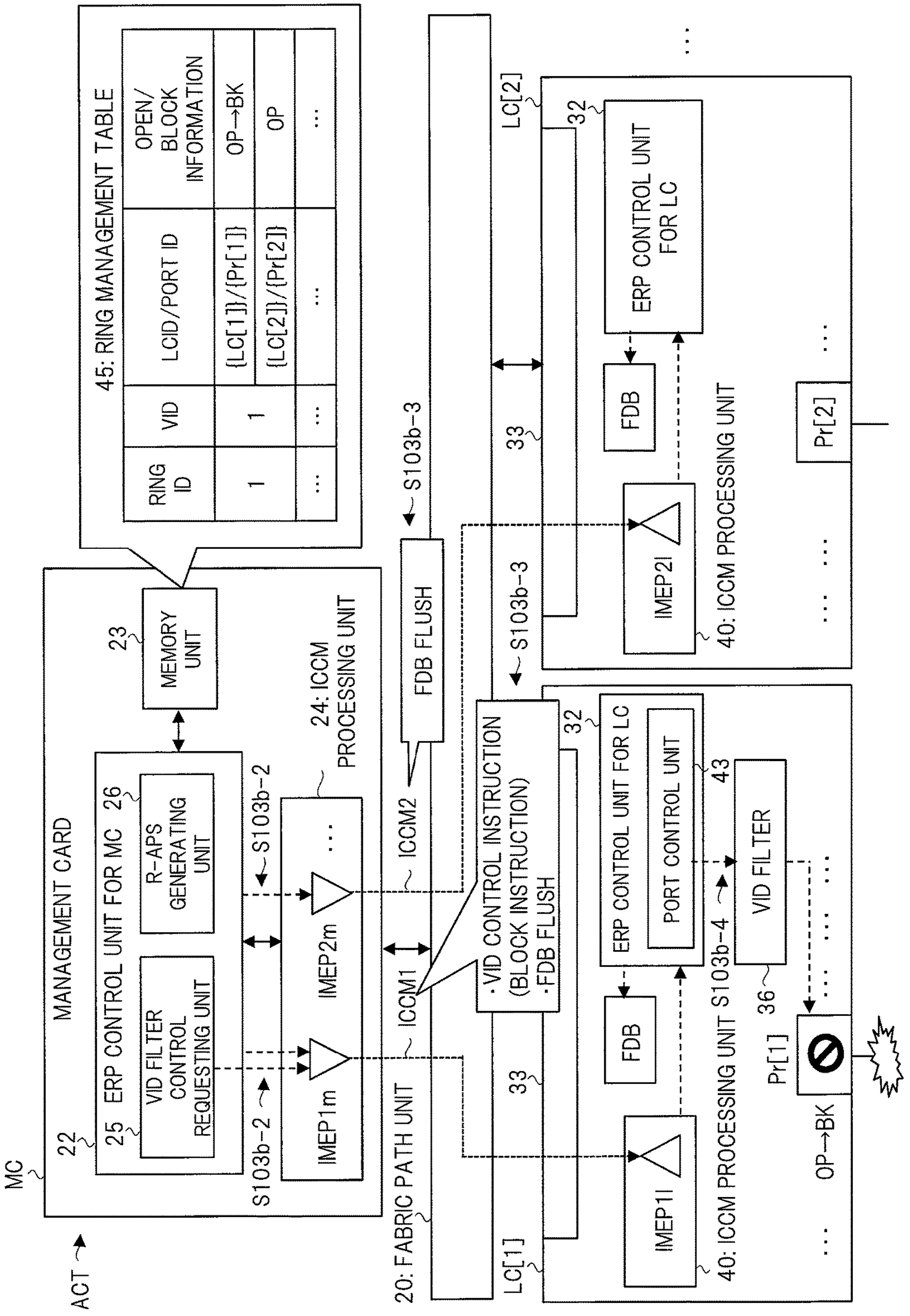
FIG. 9 is an explanatory view showing the operation example continued from FIG. 8.
Figure 10:
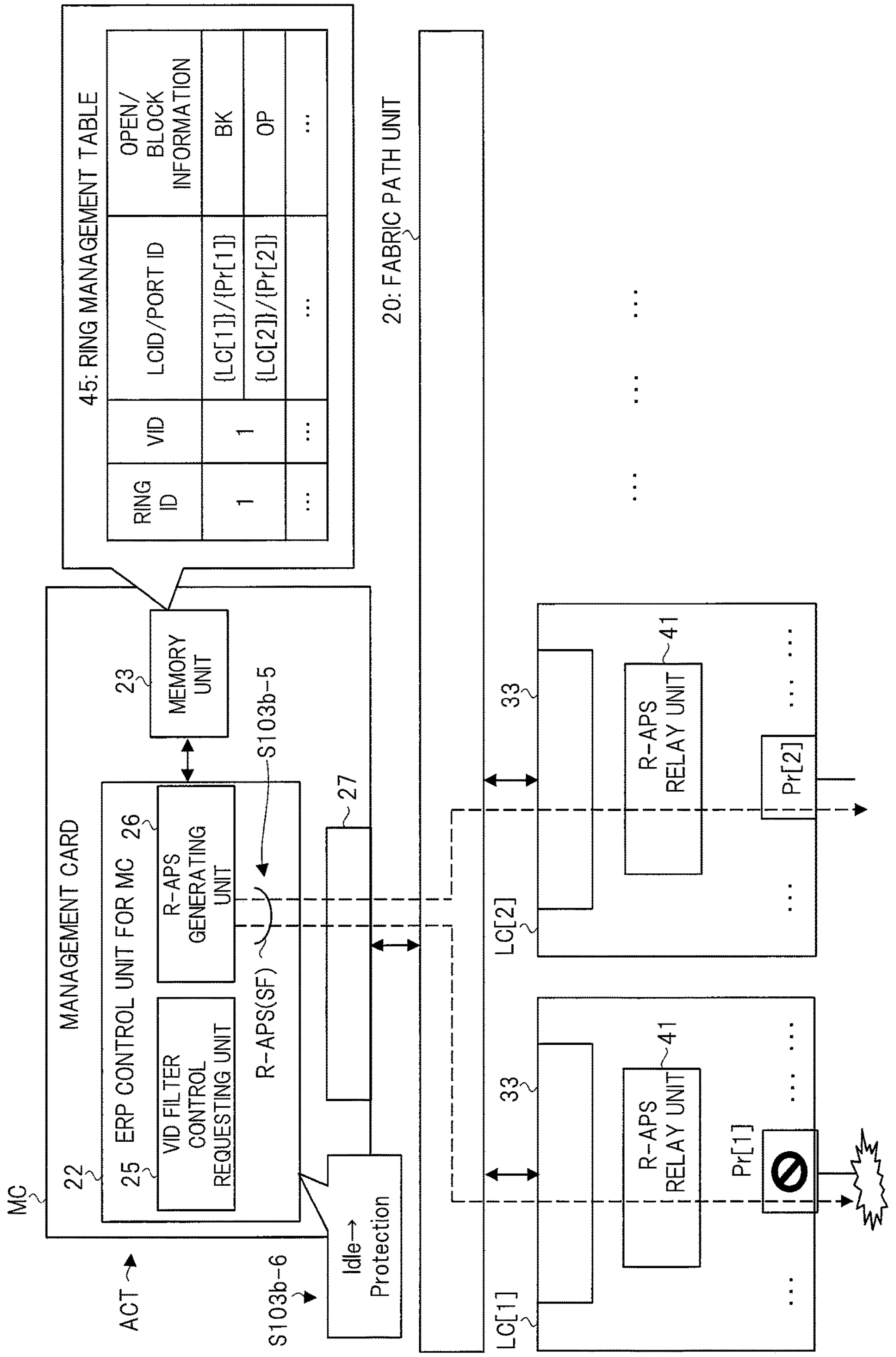
FIG. 10 is an explanatory view showing the operation example continued from FIG. 9.

FIG. 8 is an explanatory view showing an example of a ring protocol operation in the detection of fault occurrence to be a premise in the relay device of FIG. 5 and FIG. 6. FIG. 9 is an explanatory view showing the operation example continued from FIG. 8, and FIG. 10 is an explanatory view showing the operation example continued from FIG. 9. FIG. 8 to FIG. 10 show the operation example of the relay device SWc of FIG. 3 in the steps S102 and S103*b*. Here, the operation example of the management card MC in the active state ACT (active card) which corresponds to one of the management cards MC1 and MC2 will be described.

In FIG. 8, first, the OAM processing unit 37 of the line card LC[1] having the ring port Pr[1] detects the occurrence of fault (for example, the LOC state) of the ring port Pr[1] (steps S102 and S102-1). In this case, the ERP control unit 32 for LC of the line card LC[1] stores the fault information in the ICCM frame ICCM1 transmitted from the ICCM processing unit 40 (step S102-2). The fault information is, for example, the identifier of the place of fault occurrence (here, {LC[1]}/{Pr[1]}) or the like. In this specification, for example, {AA} represents an identifier for "AA".

The ICCM processing unit 24 of the management card MC receives the ICCM frame in which the fault information is stored (step S102-3). When the ICCM processing unit 24 has received the ICCM frame ICCM1 in which the fault information is stored, the ERP control unit 22 for MC detects the fault occurrence (SF) based on the ITU-T G.8032 (step S103*b*-1). In this case, the ERP control unit 22 for MC recognizes the ring network to which the place of fault occurrence belongs and the ring port connected to the ring network by referencing a ring management table 45 previously set in the memory unit 23 as shown in FIG. 9.

In the example of FIG. 9, the ring management table 45 retains a ring ID assigned for each ring network, the VLAN identifier VID and the ring port ID belonging to each ring ID and open/block information of each ring port ID. Here, the ring port IDs of the VLAN identifier VID=1 (specifically, line card ID/port ID) {LC[1]}/{Pr[1]} and {LC[2]}/{Pr[2]} belong to the ring network of the ring ID=1, and the ring ports Pr[1] and Pr[2] are both in the open state OP. The ERP control unit 22 for MC can recognize which ring network (ring ID) the fault occurs in by referencing the ring management table 45 with using the fault information (here, {LC[1]}/{Pr[1]}).

In the example of FIG. 1 and others, the relay system includes one ring network 10, but when it includes a plurality of ring networks, the ring ID of each ring network and the VLAN identifier VID and the ring port ID belonging to the ring ID are set in the ring management table 45. For example, the ring ID=2, the VLAN identifier VID=2, the ring port ID="{LC[1]}/{Pr[1]} and {LC[2]}/{Pr[2]}" are set to the ring management table 45.

The VID filter control requesting unit 25 of the ERP control unit 22 for MC issues a VID control instruction (block instruction) for controlling the ring port Pr[1] and the VLAN identifier VID of the fault place to the block state BK based on the received fault information ({LC[1]}/{Pr[1]}) (step S103*b*-2). In addition, the VID filter control requesting unit 25 changes the open/block information of the ring port Pr[1] of the ring management table 45 from the open state OP to the block state BK in conjunction with the issuance of the block instruction. Then, the ERP control unit 22 for MC stores the VID control instruction (block instruction) in the ICCM frame ICCM1 transmitted from the ICCM processing unit 24 and directed to the line card LC[1] (step S103*b*-2).

Also, in practice, the ERP control unit 22 for MC issues an execution instruction of the FDB flush in addition to the block instruction (step S103*b*-2) and stores the execution instruction in each of the ICCM frames ICCM1, ICCM2, . . . (step S103*b*-3). At this time, the ERP control unit 22 for MC determines the ring ID to be the target of the FDB flush (that is, ring ID in which the fault occurrence is detected) based on the ring management table 45, and specifies the ring ID in the execution instruction of the FDB flush.

The ICCM processing unit 40 of the line card LC[1] receives the ICCM frame ICCM1 in which the block instruction and the execution instruction of the FDB flush are stored (step S103*b*-3). The ERP control unit 32 for LC of the line card LC[1] (specifically, port control unit 43) controls the VID filter 36 in accordance with the block instruction contained in the ICCM frame ICCm1 and actually controls the corresponding ring port (here, Pr[1]) and the VLAN identifier VID to the block state BK (step S103*b*-4). Also, the ERP control unit 32 for LC flushes the entry of the FDB including the specified ring ID in accordance with the execution instruction of the FDB flush contained in the ICCM frame ICCM1. The other line cards LC[2], . . . also execute the FDB flush in the same manner.

Furthermore, as shown in FIG. 10, the R-APS generating unit 26 of the ERP control unit 22 for MC generates the R-APS (SF) frame in accordance with the execution of the block instruction described above (step S103*b*-5). Specifically, the R-APS generating unit 26 generates two R-APS (SF) frames including the predetermined ring ID and the predetermined VLAN identifier VID based on the ring management table 45. The R-APS generating unit 26 adds the destination port identifiers (here, {LC[1]}/{Pr[1]} and {LC[2]}/{Pr[2]}) to the two generated R-APS (SF) frames and transmits them to the fabric path unit 20 through the fabric interface unit 27.

In addition, the ERP control unit 22 for MC shifts the ring state of its own device from the idle state to the protection state (step S103*b*-6). Meanwhile, the R-APS relay units 41 of the line card LC[1] and the line card LC[2] receive the R-APS (SF) frames and transmit them to the destination ring ports Pr[1] and Pr[2], respectively, through the interface unit 30.

<<Ring Protocol Operation of Relay Device in Reception of R-APS (SF) (Premise)>>

Figure 11:
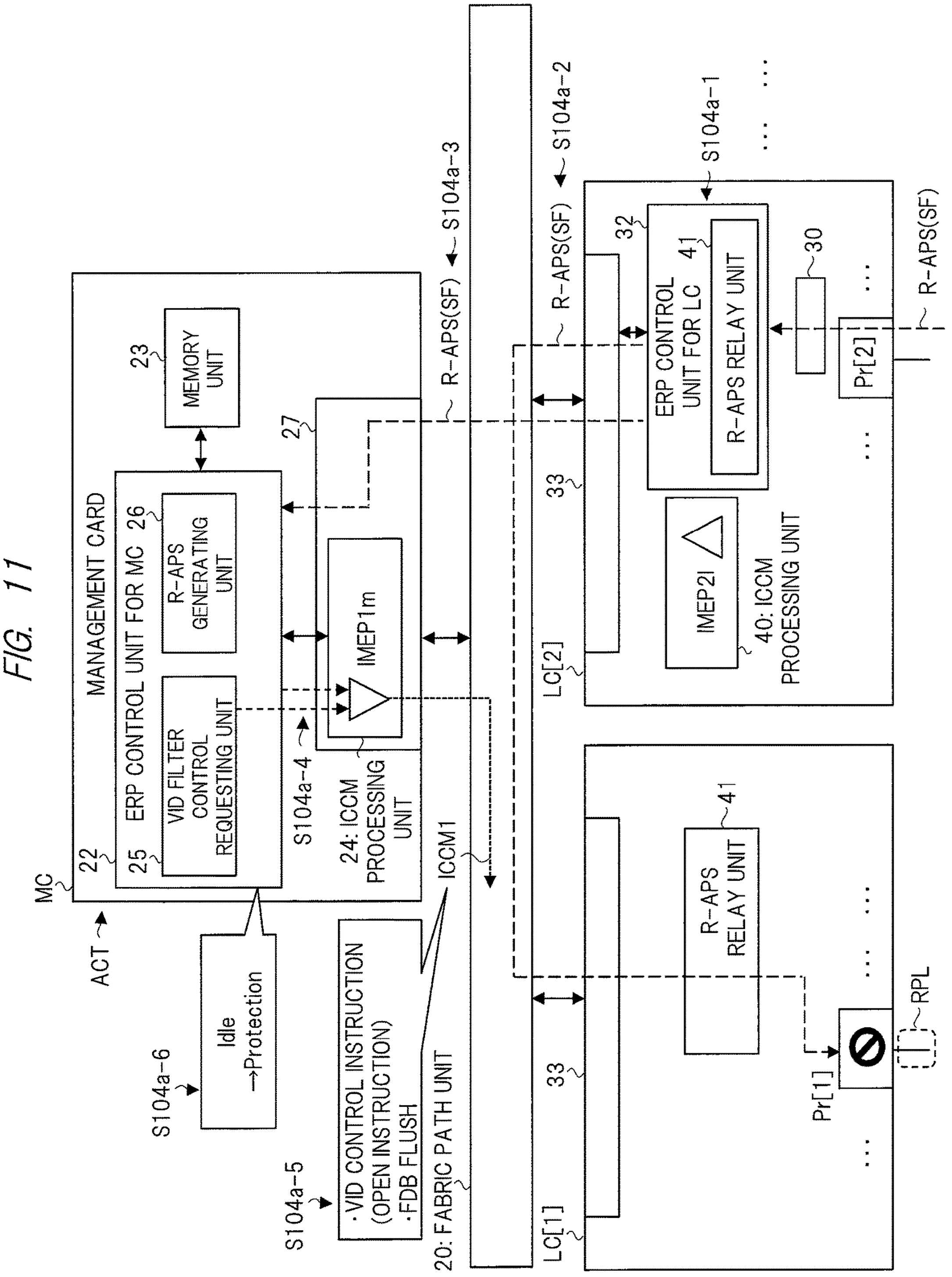
FIG. 11 is an explanatory view showing an example of a ring protocol operation in the reception of an R-APS (SF) frame to be a premise in the relay device of FIG. 5 and FIG. 6.

FIG. 11 is an explanatory view showing an example of a ring protocol operation in the reception of an R-APS (SF)

frame to be a premise in the relay device of FIG. 5 and FIG. 6. FIG. 11 shows the operation example of the relay device SWa of FIG. 3 in the step S104*a*. The operation example of the active card will be described like the case of FIG. 8 to FIG. 10.

In FIG. 11, the R-APS relay unit 41 of the ERP control unit 32 for LC of the line card LC[2] receives the R-APS (SF) frame received at the ring port Pr[2] through the interface unit 30 (step S104*a*-1). The R-APS relay unit 41 relays the received frame to the ring port Pr[1] through the fabric path unit 20 (step S104*a*-2).

In addition, the R-APS relay unit 41 determines whether the received R-APS (SF) frame is the frame to be received by its own device. When it is the frame to be received by its own device, the R-APS relay unit 41 transmits the frame to the management card MC (step S104*a*-3). Specifically, the R-APS relay unit 41 retains the information similar to that of the ring management table 45 shown in FIG. 11, and determines whether the frame is to be received by its own device based on whether the VLAN identifiers VID match in the received R-APS frame and the ring port.

The ERP control unit 22 for MC of the management card MC receives the R-APS (SF) frame. The VID control requesting unit 25 of the ERP control unit 22 for MC recognizes the ring network to be the target of the SF by referencing the ring ID of the received R-APS (SF) frame. In this example, since the ERP control unit 22 for MC belongs to the owner node in the ring network, the VID control requesting unit 25 issues the VID control instruction to control the RPL (that is, VLAN identifier VID=1 and ring port Pr[1]) to the open state OP (open instruction) (step S104*a*-4).

Also, in practice, the ERP control unit 22 for MC issues the execution instruction of the FDB flush in addition to the open instruction (step S104*a*-4). The ERP control unit 22 for MC stores the open instruction and the execution instruction of the FDB flush in the ICCM frame ICCM1 transmitted from the ICCM processing unit 24 and directed to the line card LC[1] (step S104*a*-5). Furthermore, the ERP control unit 22 for MC shifts the ring state of its own device from the idle state to the protection state (step S104*a*-6).

Though not illustrated, the ERP control unit 22 for MC issues the execution instruction of the FDB flush to the other line cards LC[2], . . . like the case of FIG. 9. Then, though not illustrated, the ERP control units 32 for LC of each of the line cards LC[1], LC[2], . . . perform the process in accordance with the VID control instruction and the execution instruction of the FDB flush from the ERP control unit 22 like the case of FIG. 9.

As described above, in the relay device shown in FIG. 5 and FIG. 6, the ERP control unit 22 for MC of the active card mainly performs the ring protocol operation. As a typical example thereof, the active card determines the open or block of the ring port in accordance with the event based on the ring protocol, and issues the open instruction or block instruction of the ring port to the line card. Meanwhile, the ERP control unit 32 for LC of the line card subordinately performs the ring protocol operation by merely executing the instruction from the ERP control unit 22 for MC.

<<Redundancy Scheme of Relay Device (Comparative example) and Problem Thereof>>

Figure 22:
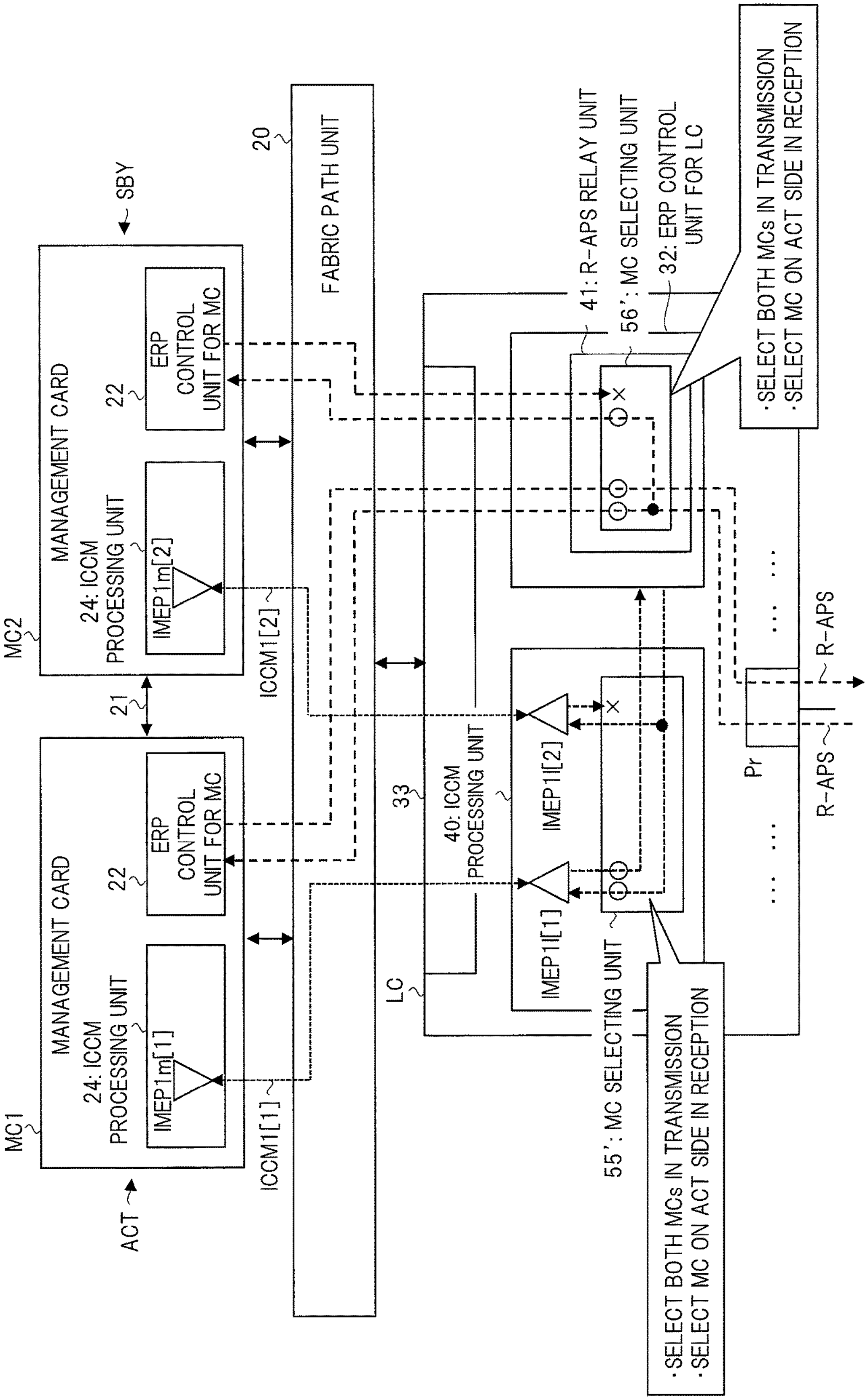
FIG. 22 is a schematic view showing a configuration example of a main part relating to a redundancy scheme and an example of a ring protocol operation in a relay device examined as a comparative example of the present invention.

FIG. 22 is a schematic view showing a configuration example of a main part relating to a redundancy scheme and an example of a ring protocol operation in a relay device examined as a comparative example of the present invention. In the relay device of FIG. 22, the ICCM processing unit 40 and the R-APS relay unit 41 of the line card LC include the MC selecting units 55' and 56', respectively.

The MC selecting unit 55' transmits various kinds of information (for example, place of fault occurrence in the step S102-2 of FIG. 8) from the ERP control unit 32 for LC to both of the management cards MC1 and MC2 via the ICCM frames ICCM1[1] and ICCM1[2]. Meanwhile, when the various kinds of information (for example, VID control instruction in the step S103*b*-3 of FIG. 9) are received from both of the management cards MC1 and MC2 via the ICCM frames ICCM1[1] and ICCM1[2], the MC selecting unit 55' selects the instruction from the active card (here, management card MC1) and transmits it to the ERP control unit 32 for LC.

Similarly, when the MC selecting unit 56' has received the R-APS frame at the ring port Pr, it transmits the R-APS frame to both of the management cards MC1 and MC2. Meanwhile, when the MC selecting unit 56' has received the R-APS frame from both of the management cards MC1 and MC2, it selects the R-APS frame from the active card (management card MC1) and transmits it to the ring port Pr.

As described above, in the redundancy scheme of FIG. 22, by applying the scheme of the Patent Document 1, the same inputs are given to both of the management cards MC1 and MC2 to make them perform the same operation, and the output from the active card is selected out of the same outputs from the management cards MC1 and MC2. For example, when the active change described in FIG. 7 has occurred in the state of FIG. 22, the MC selecting units 55' and 56' both select the management card MC2 upon reception of the instruction from both of the management cards MC1 and MC2.

This redundancy scheme is advantageous when both of the management cards MC1 and MC2 perform the ring protocol operation always at the same timing with the inclusion of input and output. In practice, however, a predetermined time lag sometimes occurs between the management cards MC1 and MC2, so that there is fear that the problem shown in FIG. 23 may arise.

Figure 23:
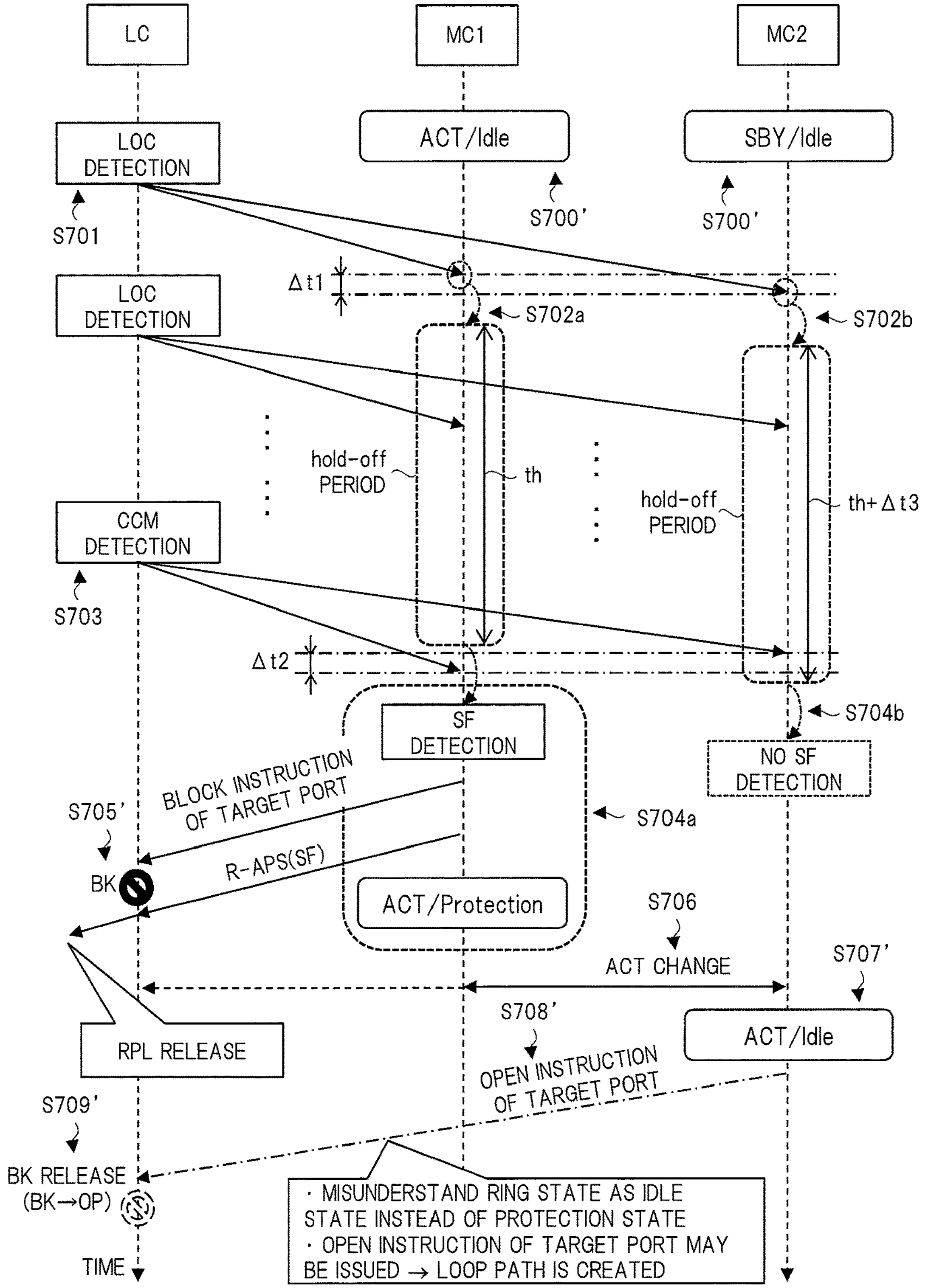
FIG. 23 is a sequence diagram showing an example of a ring protocol operation to be a problem in the occurrence of an active change in the relay device of FIG. 22.

FIG. 23 is a sequence diagram showing an example of a ring protocol operation to be a problem in the occurrence of an active change in the relay device of FIG. 22. In FIG. 23, first, the management card MC1 is an active card (ACT) and the management card MC2 is a standby card (SBY). Also, the management cards MC1 and MC2 both recognize the ring state based on the ring protocol as an idle state (step S700'). The case where the LOC state (fault) of the ring port is detected by the line card LC in this state is assumed (step S701).

The line card LC notifies both of the management cards MC1 and MC2 that the ring port is in the LOC state. In more details, the management cards MC1 and MC2 detect the fault occurrence (SF) of the ring network not only when the LOC state of the ring port is detected but also when the LOC state continues for a predetermined period (referred to as hold-off period). Here, the timing error Δt1 is sometimes caused upon reception of the LOC state in the management cards MC1 and MC2, and there is fear that the hold-off timers start at different timings (steps S702*a* and S702*b*).

Thereafter, the management cards MC1 and MC2 receive the notification that the ring port is in the CCM state (that is, no fault) from the line card LC around the timing when the hold-off period the finishes. However, there may be the case where the detection result of the fault occurrence (SF) differs in the management cards MC1 and MC2 due to the timing error Δt1 at the reception of the LOC state, the timing error Δt2 at the reception of the CCM state, the timer error Δt3 of the hold-off period th or the like.

Here, the management card MC1 detects the fault occurrence (SF), and then issues the block instruction of the target ring port, generates and transmits the R-APS frame and shifts the ring state from the idle state to the protection state in accordance with the result of the detection (step S704*a*). The line card LC which has received the block instruction from the active card actually controls the target ring port to the block state BK (step S705'). In addition, the line card LC transmits the R-APS (SF) frame to the ring network, and the RPL in the ring network is released in accordance with this.

Meanwhile, the management card MC2 does not detect the fault occurrence (SF) unlike the management card MC1 (step S704*b*). In such a state, the active change is caused in the relay device (step S706). Consequently, the management card MC2 becomes the active card, but it recognizes the ring state as the idle state instead of the protection state before the active change is caused (step S707'). As a result, there is fear that the management card MC2 issues the open instruction to the ring port in the block state BK in the step S705' depending on the cases (step S708'). When the line card LC changes the ring port from the block state BK to the open state OP based on the open instruction from the active card, a loop path is created in the ring network (step S709').

As described in the typical operation example above, there is fear that unconformity arises in the ring protocol operation before and after the active change in the redundancy scheme of FIG. 22. As a result, there is fear that a problem such as the creation of the loop path arises. Furthermore, even when the loop path is not created, if the situation in which a relay device and another relay device have different recognitions about the ring state occurs, another problem that the change of the blocked port of the ring network cannot be normally performed may arise. Thus, it is advantageous to use the scheme of the first embodiment described below.

<<Redundancy Scheme of Relay Device (First Embodiment)>>

Figure 12:
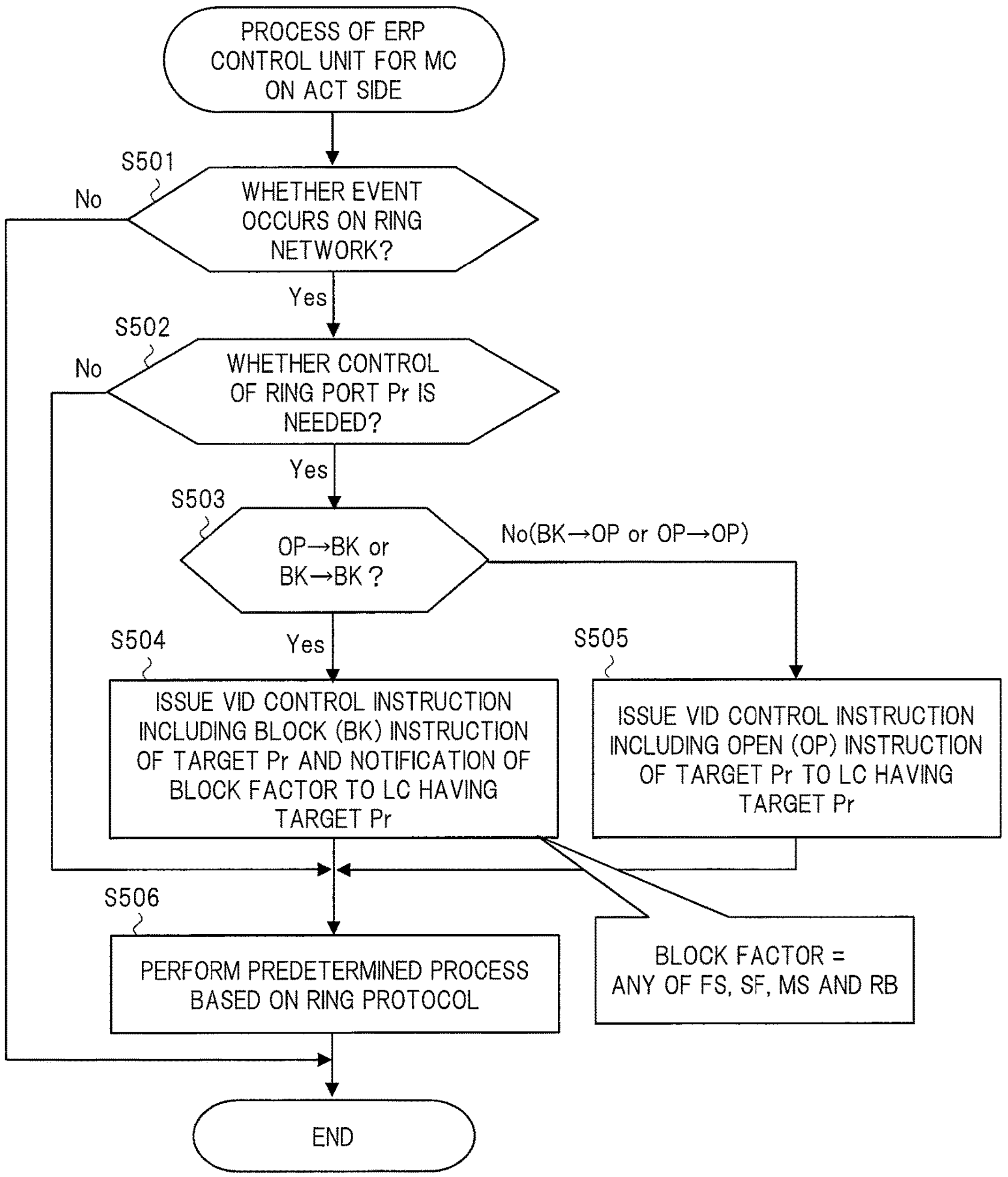
FIG. 12 is a flowchart showing an example of main process contents performed by an ERP control unit for MC in a management card serving as an active card in the relay device of FIG. 5.
Figure 13:
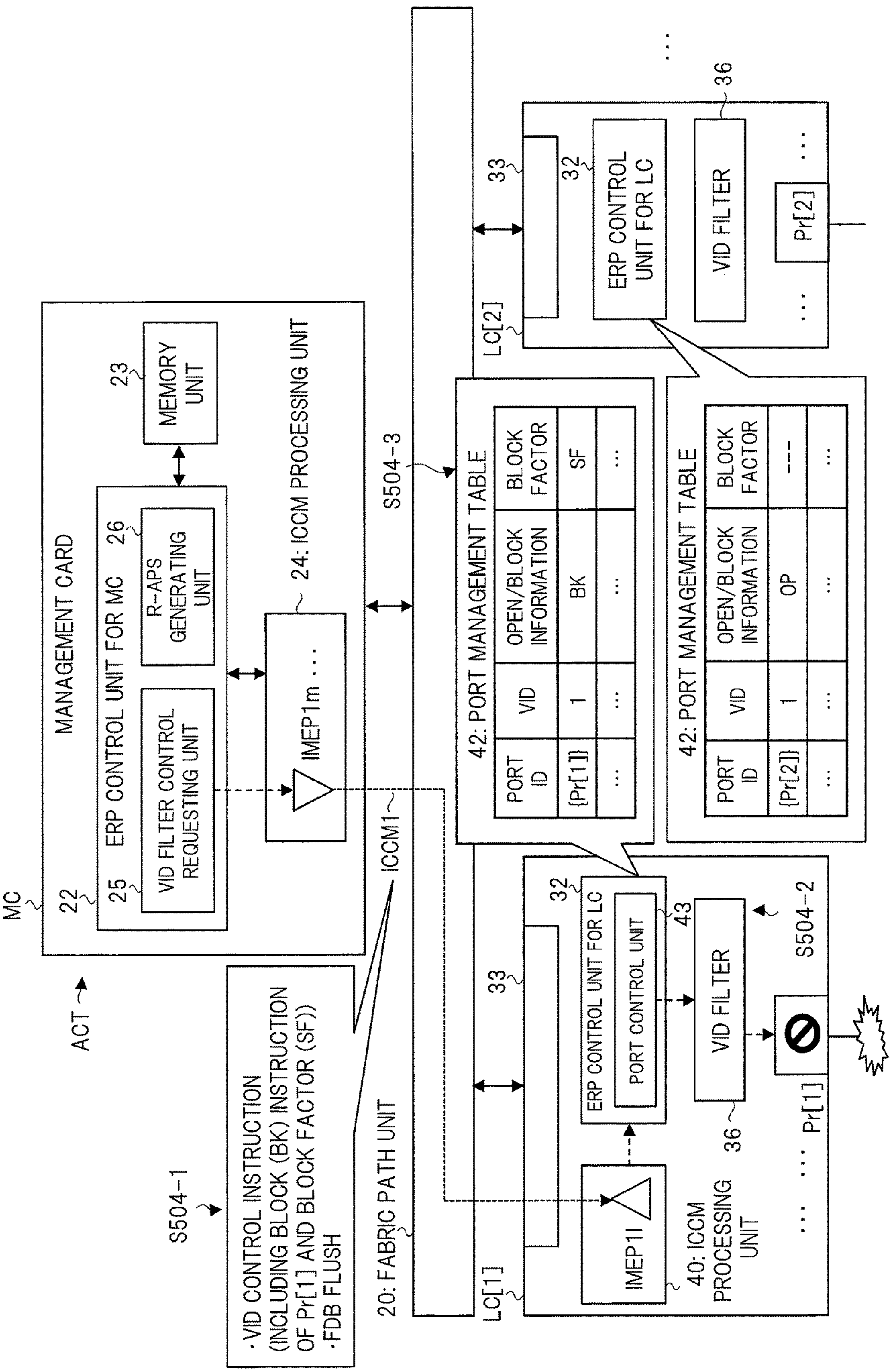
FIG. 13 is a supplementary view for describing a part of the process contents of FIG. 12.

FIG. 12 is a flowchart showing an example of main process contents performed by the ERP control unit for MC in the management card serving as the active card in the relay device of FIG. 5. FIG. 13 is a supplementary view for describing a part of the process contents of FIG. 12. In FIG. 12, the ERP control unit 22 for MC of the active card determines whether an event based on the ring protocol occurs on the ring network (step S501). The event based on the ring protocol includes the local event and the remote event described in FIG. 3 and FIG. 4.

For example, the local event is notified via the ICCM frame like the case of the SF detection of FIG. 8 or directly input from the outside of the device to the ERP control unit 22 for MC like the FS command and the like described above. Meanwhile, the remote event is notified from a different relay device via the R-APS frame like the R-APS (SF) frame of FIG. 11.

The ERP control unit 22 for MC finishes the process when the event does not occur. On the other hand, when the event occurs, the ERP control unit 22 for MC determines whether the control of the ring port Pr is necessary based on the ring protocol, and changes the ring port to the open state or the block state when the control is necessary (step S502). The determination conditions and the selection of open/block at this time differ depending on the role of the relay devices (owner node, neighbor node or other nodes), types of events (local event or remote event) and others. Here, when the control to the open state OP is necessary (in other words, control to the block state BK is unnecessary) (step S503), the ERP control unit 22 for MC issues the open instruction of the ring port Pr to the line card LC having the target ring port Pr (step S505).

Meanwhile, when the control to the block state BK is necessary (step S503), the ERP control unit 22 for MC issues the block instruction to the line card LC having the target ring port Pr, and further notifies the line card LC of the block factor representing the event to be the basis of the block instruction (step S504). Specifically, for example, as shown in FIG. 8 and FIG. 9, the fault (SF) is detected at the ring port Pr in the open state OP, and the ERP control unit 22 for MC changes the ring port Pr in the open state OP to the block state BK in accordance with the detection of the fault. Alternatively, for example, the FS command is issued to the ring port Pr controlled to the block state BK due to the fault (SF), and the ERP control unit 22 for MC controls the ring port Pr in the block state BK to the block state BK based on a different factor (FS) in accordance with the issuance. Here, the case shown in FIG. 8 and FIG. 9 is assumed by way of example.

In this case, as shown in FIG. 13, the ERP control unit 22 for MC makes not only the block instruction of the ring port Pr[1] similar to that of the case of FIG. 9 but also the block factor thereof (SF) be contained in the VID control instruction from the VID filter control requesting unit 25. Then, the ERP control unit 22 for MC stores the VID control instruction to the ICCM frame ICCM1 directed to the line card LC[1] like the case of FIG. 9 (step S504-1).

Meanwhile, as shown in FIG. 13, the ERP control unit 32 for LC (specifically, port control unit 43) which has received the VID control instruction from the active card provides a predetermined setting to the VID filter 36 in accordance with the open instruction or the block instruction (here, block instruction) contained in the VID control instruction like the case of FIG. 9. In this manner, the port control unit 43 controls the actual open and block of the ring port Pr[1] (here, controls the ring port Pr[1] to the block state BK) (step S504-2).

In addition, the ERP control unit 32 for LC registers the actual open/block information (here, block state BK) of the ring port Pr[1] (and VLAN identifier VID=1) and the block factor (here, SF) of the ring port Pr[1] contained in the VID control instruction, to the port management table 42 (step S504-3). As a result of the process of the step S505 of FIG. 12, the fact that the ring port Pr[2] (and VLAN identifier VID=1) is in the open state OP is registered in the port management table 42 of the ERP control unit 32 for LC of the line card LC[2] as shown in FIG. 13.

Here, the block factor in the step S504 of FIG. 12 is determined from FS (Forced Switch), SF (Signal Fail), MS (Manual Switch) and RB (RPL Blocked) in the case of the ITU-T G.8032. However, the scheme of the first embodiment is not necessarily limited to the ITU-T G.8032, and other ring protocols are also applicable. Generally, in the ring protocol, the block factors include a factor such as the SF representing that a fault occurs at the ring port and a factor such as the RB representing that the ring port is a blocked port of the ring network by default.

In FIG. 12, the ERP control unit 22 for MC performs the predetermined process based on the ring protocol (for example, transmission of the R-APS frame, FDB flush and shift of the ring state) after the process of the step S504 or the step S505 (step S506). In addition, the ERP control unit 22 for MC performs the process of the step S506 also when the control of the ring port Pr is unnecessary in the step S502.

Figure 14:
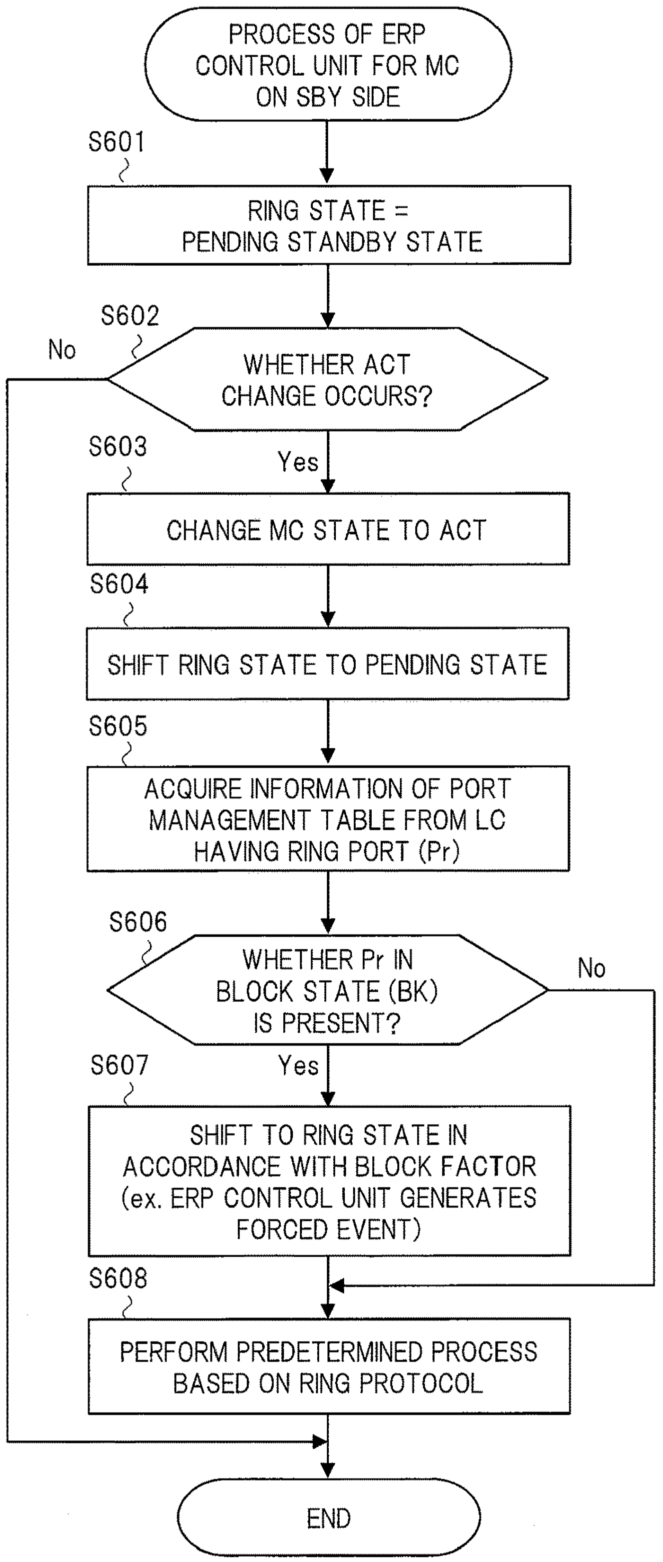
FIG. 14 is a flowchart showing an example of main process contents performed by an ERP control unit for MC in a management card serving as a standby card in the relay device of FIG. 5.

FIG. 14 is a flowchart showing an example of main process contents performed by an ERP control unit for MC in a management card serving as a standby card in the relay device of FIG. 5. FIG. 15 is a supplementary view for describing a part of the process contents of FIG. 14. In FIG. 14, the ERP control unit 22 for MC of the standby card stands by with the ring state set to a pending standby state (step S601). The pending standby state indicates the state newly provided in the first embodiment as the state before the shift to the pending state based on the ITU-T G.8032.

In this state, the ERP control unit 22 for MC waits for the occurrence of the active change (predetermined change instruction) (step S602). When the active change is caused, the ERP control unit 22 for MC changes the management card to the active card in accordance with the active change (step S603) and shifts the ring state from the pending standby state to the pending state (step S604). Then, the ERP control unit 22 for MC acquires the information retained in the port management table 42 from each line card having the ring port Pr (step S605).

Here, the memory units 23 of the active card and the standby card preliminarily retain the ring management table 45 shown in FIG. 9 as common information. The ERP control unit 22 for MC which has acquired the information retained in the port management table 42 updates the open/block information of the ring management table 45 based on the actual open/block information of each ring port contained in the port management table 42.

Next, the ERP control unit 22 for MC determines whether the information retained in the port management table 42 contains the block factor (in other words, ring port Pr in the block state BK) (step S606). When the block factor is not contained, the ERP control unit 22 for MC performs the predetermined process based on the ring protocol as the active card (step S608). Meanwhile, when the block factor is contained, the ERP control unit 22 for MC shifts the ring state in accordance with the block factor (step S607).

In the step S607, specifically, in the state where the ring state is set to the pending state in the step S604, the ERP control unit 22 for MC shifts the ring state in accordance with the block factor from the pending state by internally generating the forced event in accordance with the block factor. At this time, for example, the forced event shown in FIG. 15 can be used. In FIG. 15, the ERP control unit 22 for MC generates the FS command when the acquired block factor is FS, generates the local SF when the factor is SF, generates the MS command when the factor is MS, and generates the clear command when the factor is RB.

The ring state of the ERP control unit 22 for MC shifts to the FS state in accordance with the FS command, shifts to the protection state in accordance with the local SF, shifts to the MS state in accordance with the MS command, and shifts to the idle state in accordance with the clear command. The ERP control unit 22 for MC restores the ring state to a normal state in this manner, and then performs a predetermined process based on the ring protocol in the step S608.

Figure 16:
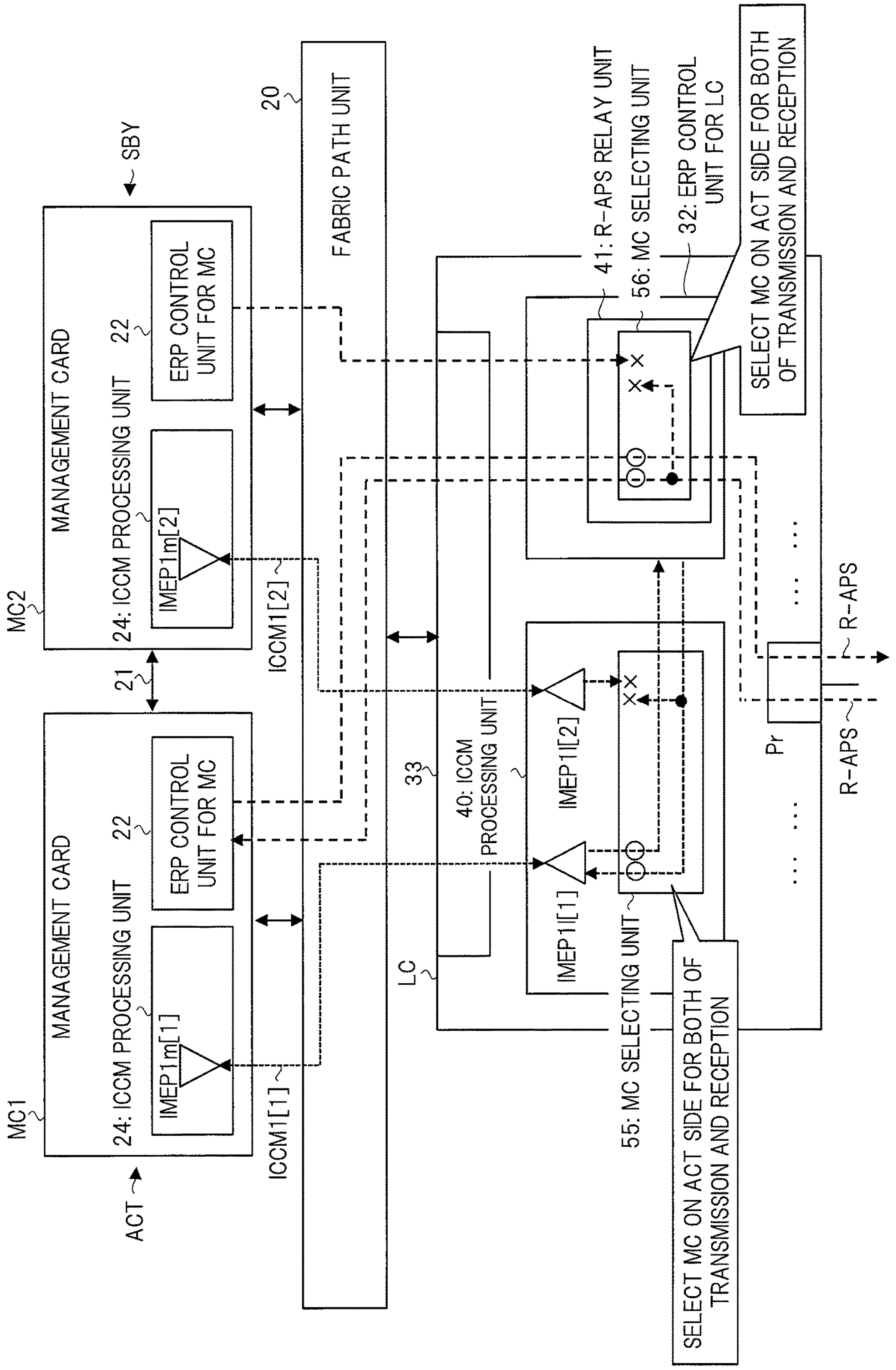
FIG. 16 is a schematic view showing a configuration example of a main part relating to a redundancy scheme and an example of a ring protocol operation in the relay device of FIG. 5 and FIG. 6.

FIG. 16 is a schematic view showing a configuration example of a main part relating to a redundancy scheme and an example of a ring protocol operation in the relay device of FIG. 5 and FIG. 6. In the relay device of FIG. 16, the ICCM processing unit 40 and the R-APS relay unit 41 of the line card LC include MC selecting units (management card selecting units) 55 and 56, which perform the operations different from those of the case of FIG. 22, respectively.

The MC selecting unit 55 transmits various kinds of information from the ERP control unit 32 for LC to the active card (here, management card MC1) via the ICCM frame ICCM1[1] and does not transmit it to the standby card (here, management card MC2) unlike the case of FIG. 22. In addition, when the MC selecting unit 55 has received the ICCM frames ICCM1 [1] and ICCM1[2] from both of the management cards MC1 and MC2, it selects the various kinds of information contained in the ICCM frame ICCM1 [1] from the active card and transmits the information to the ERP control unit 32 for LC. Note that, as described with reference to FIG. 7, the communication of the ICCM frame between IMEPs is performed at regular intervals regardless of the presence or absence of various kinds of information in order to monitor the continuity between the respective cards.

Similarly, when the MC selecting unit 56 has received the R-APS frame at the ring port Pr, it transmits the R-APS frame to the active card (here, management card MC1) and does not transmit it to the standby card (here, management card MC2) unlike the case of FIG. 22. In addition, when the MC selecting unit 56 has received the R-APS frames from both of the management cards MC1 and MC2, it selects the R-APS frame from the active card (management card MC1) and transmits the R-APS frame to the ring port Pr. At this time, as shown in FIG. 14, the standby card is in the pending standby state, and thus the R-APS frame is not transmitted in practice unlike the case of FIG. 22.

Note that the relay device shown in FIG. 5 and FIG. 6 is not always required to have the configuration and the operation of FIG. 16, and may have the configuration and the operation of FIG. 22 depending on cases. Even in this case, no particular problem occurs on the ring protocol operation. For example, the standby card does not do anything special even when it receives the R-APS frame in the pending standby state. Since the transmission of the R-APS frame to the standby card is unnecessary as described above, it is more desirable to use the configuration and the operation of FIG. 16 from the viewpoint of reducing the communication volume of the fabric path unit 20.

<<Ring Protocol Operation in Active Change>>

Figure 17:
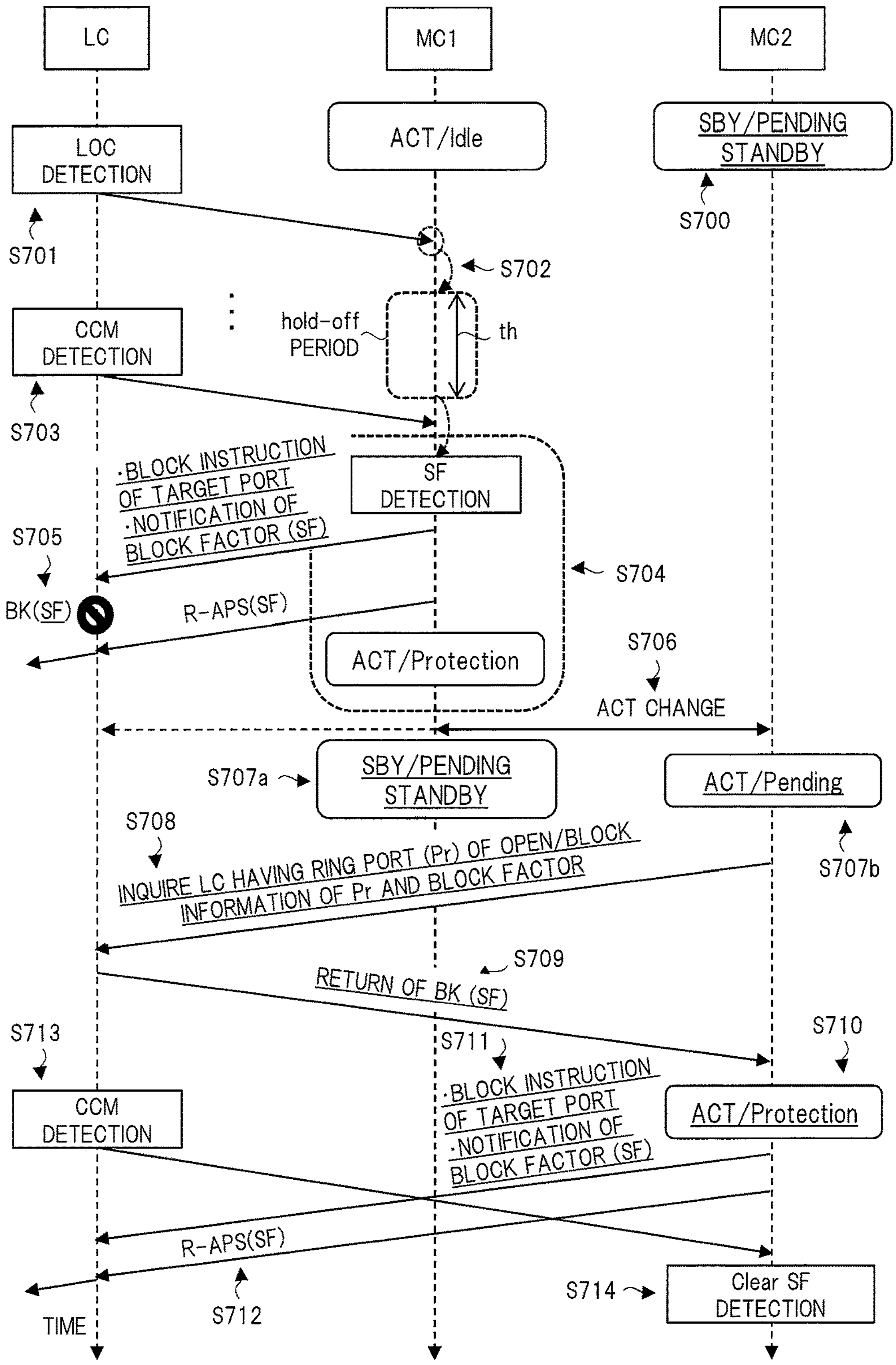
FIG. 17 is a sequence diagram showing an example of a ring protocol operation in the occurrence of an active change in the relay device of FIG. 5, FIG. 6 and FIG. 16.

FIG. 17 is a sequence diagram showing an example of a ring protocol operation in the occurrence of an active change in the relay device of FIG. 5, FIG. 6 and FIG. 16. The sequence shown in FIG. 17 solves the problem of FIG. 23 described above. Here, the difference from FIG. 23 will be mainly described. First, the management card MC2 serving as a standby card (SBY) stands by with the ring state set to the pending standby state (step S700). In this state, like the case of FIG. 23, the LOC state is detected (step S701), and the management card MC1 serving as an active card (ACT) detects the SF (step S704) through the hold-off period (step S702).

Here, the management card MC1 issues the block instruction of the target ring port to the line card LC in accordance with the detection of the SF, and notifies the block factor thereof (in this case, SF) in addition to it unlike the case of FIG. 23 (step S704). Also, the management card MC1 transmits the R-APS (SF) frame to shift the ring state to the protection state (step S704). Meanwhile, the line card LC controls the ring port to the block state BK in accordance with the block instruction (step S705) and further performs the registration of the port management table 42 as shown in FIG. 13. The active change occurs in this state (step S706).

The management card MC2 in the standby state (SBY) changes to the active card (ACT) in accordance with the active change, and shifts the ring state from the pending standby state to the pending state (step S707*b*). Meanwhile, the management card MC1 in the active state (ACT) changes to the standby card (SBY) in accordance with the active change, and shifts the ring state from the protection state to the pending standby state (step S707*a*).

The management card MC2 which has changed to the active card (ACT) acquires the information retained in the port management table 42 from the line card LC having the ring port (steps S708 and S709). The information retained in the port management table 42 contains the open/block information of each ring port and the block factor relating to the ring port in the block state. Here, the management card MC2 acquires the information that a predetermined ring port is in the block state BK and the block factor thereof is the SF from the line card LC (step S709).

The management card MC2 shifts the ring state to the state in accordance with the acquired block factor (SF) (here, protection state) (step S710). Specifically, the management card MC2 internally generates the local SF for the corresponding ring port to shift the ring state to the protection state as shown in FIG. 15. The management card MC which has shifted the ring state to the protection state issues the block instruction of the target ring port to the line card LC and notifies the line card LC of the block factor (SF) (step S711). In addition, the management card MC2 generates and transmits the R-APS (SF) frame (step S712).

In this example, the line card LC further detects the CCM state of the ring port at the timing near the execution of the steps S711 and S712 and transmits the information thereof to the management card MC2 serving as the active card (step S713). The management card MC2 detects the clear SF in accordance with the information (step S714) and then the process of fault recovery shown in FIG. 4 is performed though illustration thereof is omitted.

As described above, in the sequence of FIG. 17, each relay device on the ring network can recognize that the ring state is the protection state before and after the active change, and the inconsistency in the ring protocol operation like the case of FIG. 23 does not occur. As a result, it is possible to prevent the loop path of the ring network unlike the case of FIG. 23.

Figure 18:
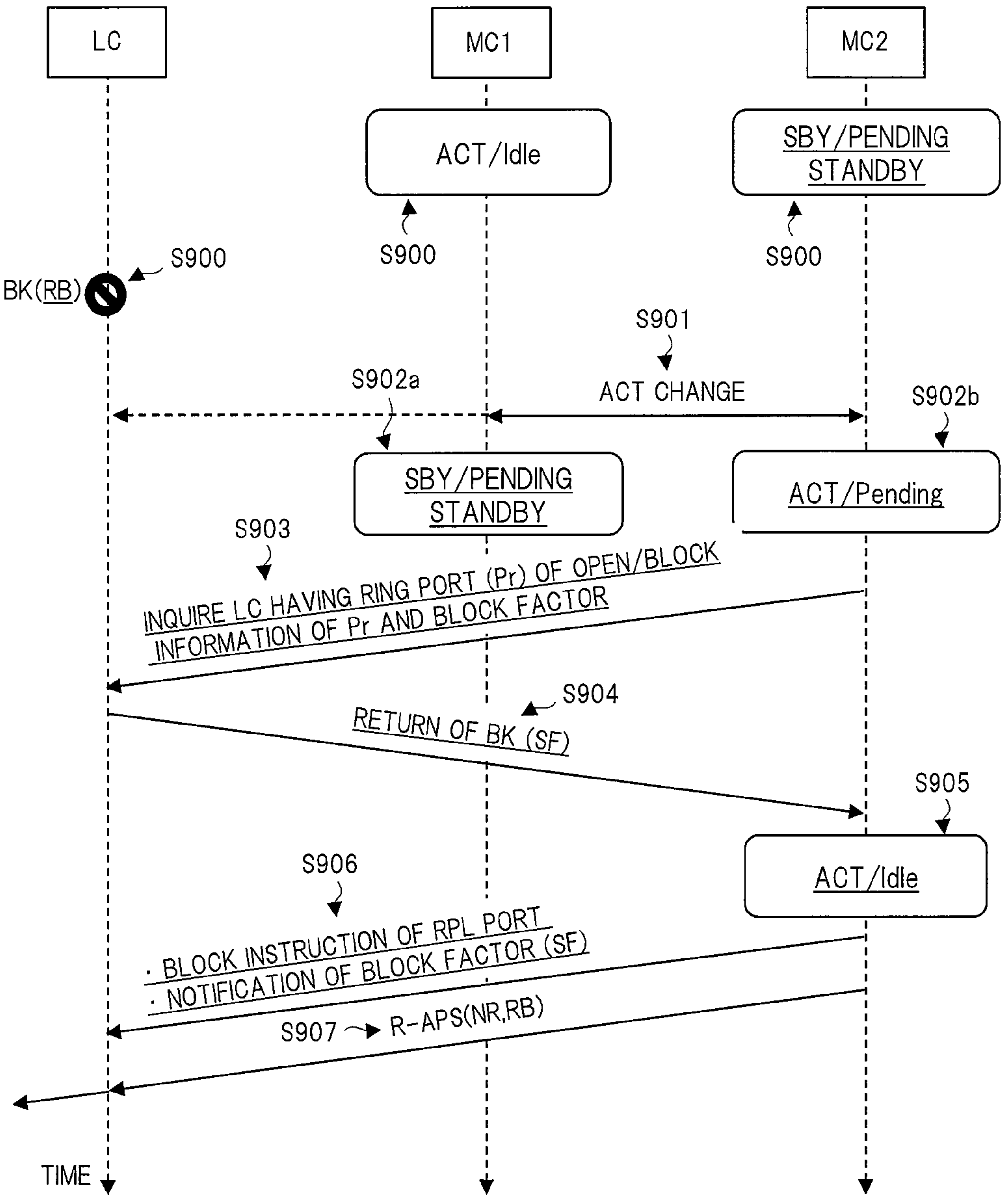
FIG. 18 is a sequence diagram showing another example of a ring protocol operation in the occurrence of an active change in the relay device of FIG. 5, FIG. 6 and FIG. 16.

FIG. 18 is a sequence diagram showing another example of a ring protocol operation in the occurrence of an active change in the relay device of FIG. 5, FIG. 6 and FIG. 16. FIG. 18 shows the case in which a relay device is an owner node. In the step S900 of FIG. 18, the management card MC1 serving as an active card (ACT) is in the idle state, and the management card MC2 serving as a standby card (SBY) is in the pending standby state. Also, the line card LC controls the ring port of RPL to the block state BK and retains RB as the block factor. The active change occurs in this state (step S901).

The management card MC2 in the standby state (SBY) changes to the active card (ACT) in accordance with the active change, and shifts the ring state from the pending standby state to the pending state (step S902*b*). Meanwhile, the management card MC1 in the active state (ACT) changes to the standby card (SBY) in accordance with the active change, and shifts the ring state from the idle state to the pending standby state (step S902*a*).

The management card MC2 which has changed to the active card (ACT) acquires the information retained in the port management table 42 from the line card LC having the ring port (steps S903 and S904). Here, the management card MC2 acquires the information that the ring port of RPL is in the block state BK and the block factor thereof is the RB from the line card LC (step S904). The management card MC2 shifts the ring state to the state in accordance with the acquired block factor (RB) (here, idle state) (step S905). Specifically, the management card MC2 internally generates the clear command to shift the ring state to the idle state as shown in FIG. 15.

The management card MC2 which has shifted the ring state to the idle state issues the block instruction of the ring port of RPL to the line card LC and notifies the line card LC of the block factor (RB) (step S906). In addition, the management card MC2 generates and transmits the R-APS (NR, RB) frame (step S907). As described above, in the sequence of FIG. 18, the inconsistency in the ring protocol operation does not occur before and after the active change.

<<Main Effect of First Embodiment>>

As described above, by using the relay device and the relay system of the first embodiment, typically, the inconsistency in the ring protocol operation does not occur before and after the active change, and the fault tolerance can be improved. Specifically, first, if the management card newly changed to the active card can recognize the actual open/block information of each ring port and the ring state based on the ring protocol at the time of the occurrence of the active change, it is possible to prevent the inconsistency in the ring protocol operation from occurring before and after the active change. The actual open/block information of each ring port is retained in the line card which actually controls the open and block of the ring port. Therefore, the management card newly changed to the active card can acquire the open/block information from the line card.

Meanwhile, the ring state at the time of the occurrence of the active change is retained in the management card newly changed to the standby card by the active change. However, considering the case where the active change occurs in accordance with the occurrence of fault of the management card, for example, there is a possibility that it is difficult for the management card newly changed to the active card to correctly acquire the ring state from the management card newly changed to the standby card (that is, management card in which the fault occurs).

In such a situation, the study by the inventor of the present invention has revealed that the management card newly changed to the active card can recover the normal ring state if the actual open/block information of each ring port and the block factor in the block state are known as described above even when the ring state itself is not known. The block factor can be retained in the line card together with the actual open/block information of each ring port. Namely, as described above, the block factor can be retained in the line card by notifying the block factor together with the block instruction of the ring port issued from the management card to the line card.

In this manner, the management card newly changed to the active card acquires the actual open/block information of the ring port and the block factor from each line card having the ring port, and thus can execute the ring protocol operation without any inconsistency. As a result, it is possible to improve the fault tolerance. Furthermore, since the management card newly changed to the active card is just required to acquire the necessary information from each line card having the ring port, the particularly complicated process is not needed, and it is possible to efficiently take over the ring protocol operation.

Second Embodiment

<<Problem of Relay Device (Comparative Example)>>

Figure 19:
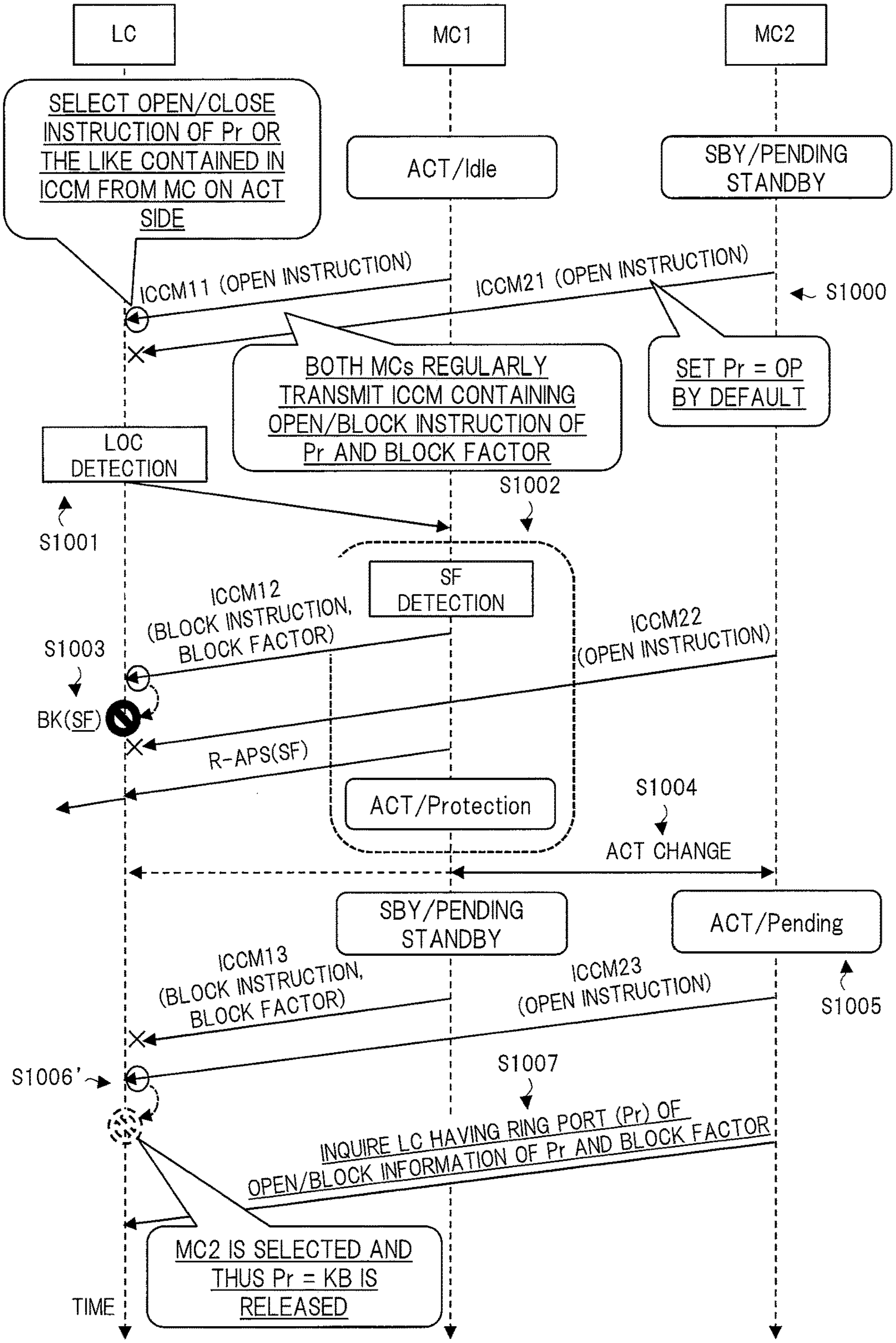
FIG. 19 is a sequence diagram showing an example of a ring protocol operation in the occurrence of an active change in the relay device examined as a comparative example of the present invention.

FIG. 19 is a sequence diagram showing an example of a ring protocol operation in the occurrence of an active change in the relay device examined as a comparative example of the present invention. As described in FIG. 7, for example, each of the management cards MC1 and MC2 regularly communicates the ICCM frame with the line card LC. Here, the VID control instruction described in FIG. 9 and others can be stored in the ICCM frame by an interruption method only when the change or the like occurs in the instruction. Alternatively, it is also possible to always store the VID control instruction in the ICCM frame transmitted regularly regardless of the presence or absence of the change in the instruction.

In this case, even if the situation in which the ICCM frame cannot be received due to any cause at a certain moment (that is, non-reception of instruction) occurs, the line card LC can receive the instruction by the next ICCM frame transmitted regularly. In this case, however, the problem shown in FIG. 19 may arise.

In FIG. 19, first, in the step S1000, the management card MC1 serving as the active card in the idle state transmits the ICCM frame ICCM11 to the line card LC, and the management card MC2 serving as the standby card in the pending standby state transmits the ICCM frame ICCM21 to the line card LC. The open instruction is stored in the ICCM frame ICCM11 and the open instruction is stored also in the ICCM frame ICCM21. Namely, in the pending standby state, the open instruction is issued as a default setting. Meanwhile, the line card LC selects the instruction from the management card MC1 serving as the active card as shown in FIG. 16.

Thereafter, the line card LC detects the LOC state (step S1001). In accordance with this, the management card MC1 detects the SF, transmits the block instruction and the block factor (SF) to the line card LC (that is, the ICCM frame ICCM12), and transmits the R-APS (SF) frame (step S1002). In accordance with this, the line card LC controls the target ring port to the block state BK, and retains the block factor (SF) (step S1003). Meanwhile, the management card MC2 also transmits the ICCM frame ICCM22 to the line card LC at approximately the same timing as the transmission of the ICCM frame ICCM12. However, the line card LC ignores the instruction (here, open instruction) contained in the ICCM frame ICCM22 from the standby card.

The active change occurs in this state (step S1004). The management card MC2 newly changed to the active card shifts the ring state to the pending state (step S1005) and acquires the information retained in the port management table 42 from the line card LC as described in the first embodiment (step S1007). In this case, however, the management card MC2 transmits the ICCM frame ICCM23 to the line card LC before completing the acquisition of the information retained in the port management table 42. Namely, there is a fear that the situation like this may occur because the ICCM frame is transmitted by the ICCM processing unit 24 at the timing independent of the ERP control unit 22 for MC.

Since the information retained in the port management table 42 is not reflected on the ICCM frame ICCM23, the open instruction is still stored therein. Meanwhile, since the line card LC has received the open instruction from the management card MC2 serving as the active card, the line card LC controls the ring port from the block state BK to the open state OP in accordance with this instruction (step S1006'). As a result, the loop path is created in the ring network. Thus, it is advantageous to use the scheme of the second embodiment described below.

<<Process of ERP Control Unit for LC>>

Figure 20:
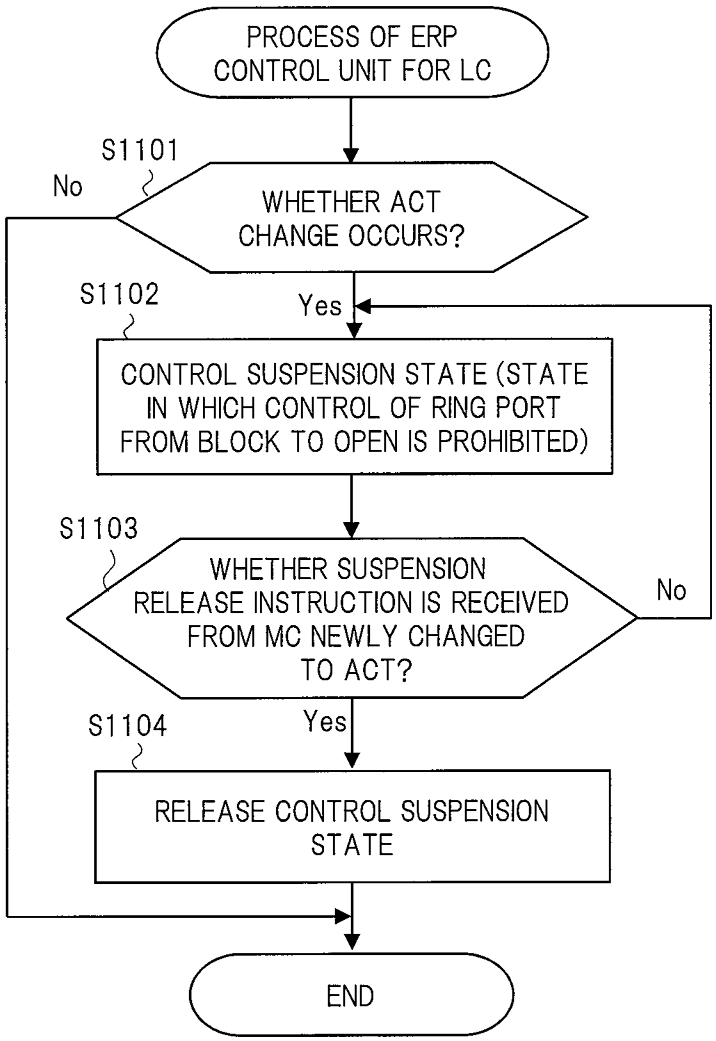
FIG. 20 is a flowchart showing an example of main process contents performed by an ERP control unit for LC of FIG. 6 in a relay device of the second embodiment of the present invention.

FIG. 20 is a flowchart showing an example of main process contents performed by the ERP control unit for LC of FIG. 6 in the relay device of the second embodiment of the present invention. In FIG. 20, the ERP control unit 32 for LC waits for the occurrence of the active change (step S1101). When the active change occurs, the ERP control unit 32 for LC (specifically, port control unit 43) shifts to a control suspension state in which the control of the ring port from the block state to the open state is prohibited in accordance with the active change (step S1102). Then, the port control unit 43 maintains the control suspension state until a suspension release instruction is issued from the management card newly changed to the active card (steps S1102 and S1103), and releases the control suspension state when the suspension release instruction is received (step S1104).

<<Ring Protocol Operation of Relay Device in Active Change (Second Embodiment)>>

Figure 21:
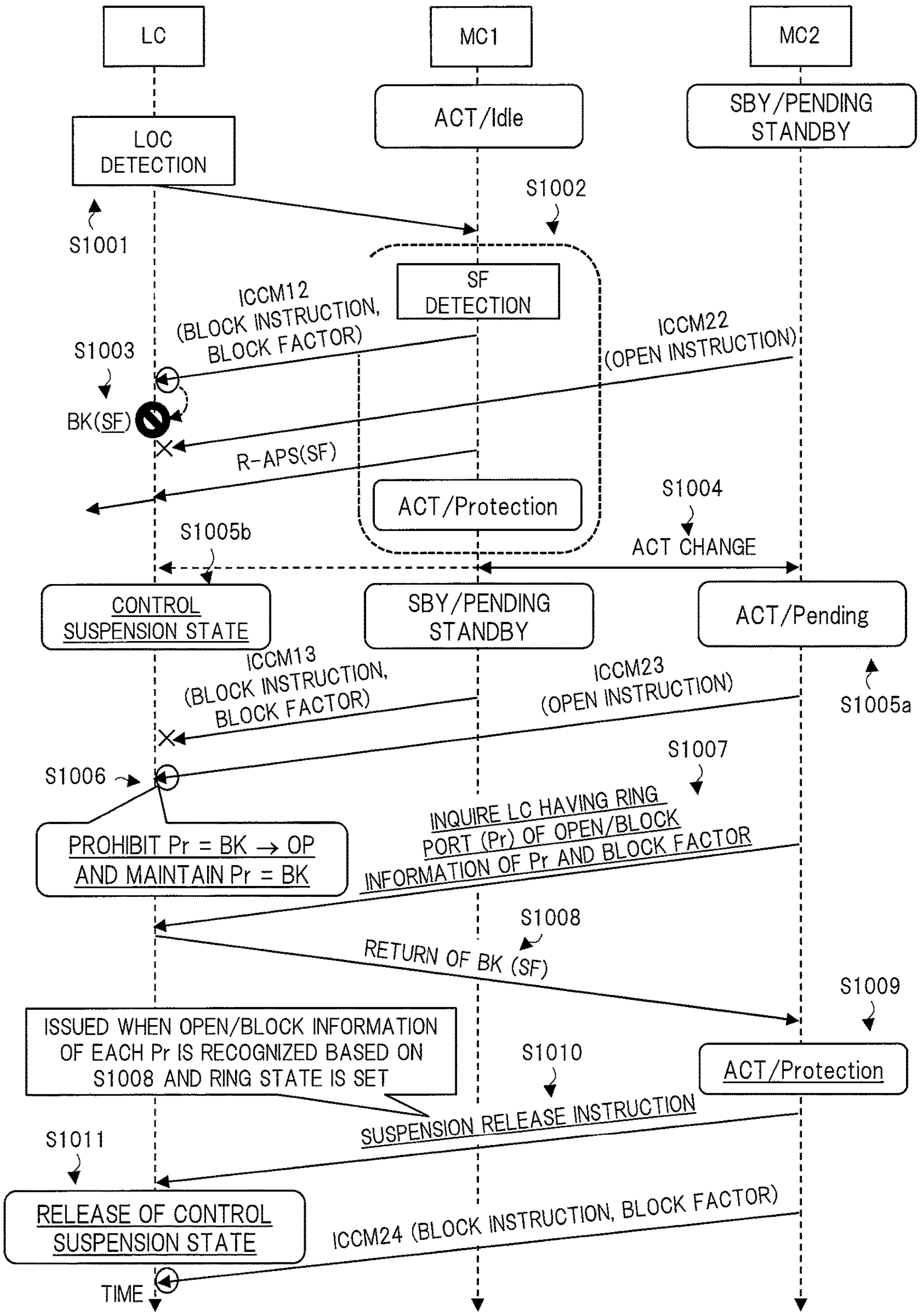
FIG. 21 is a sequence diagram showing an example of a ring protocol operation in the occurrence of an active change in the relay device of the second embodiment of the present invention.

FIG. 21 is a sequence diagram showing an example of a ring protocol operation in the occurrence of an active change in the relay device of the second embodiment of the present invention. The sequence shown in FIG. 21 is the same as the sequence shown in FIG. 19 before the occurrence of the active change in the step S1004. The management card MC2 newly changed to the active card in accordance with the active change shifts the ring state to the pending state (step S1005*a*), and transmits the ICCM frame ICCM23 having the open instruction stored therein to the line card in the same manner as the case of FIG. 19 (step S1006).

Meanwhile, the line card LC shifts to the control suspension state in accordance with the active change unlike the case of FIG. 19 (step S1005*b*). The line card LC receives the ICCM frame ICCM23 having the open instruction stored therein in the step S1006, but maintains the block state BK of the ring port due to the control suspension state. Also, the management card MC2 transmits the ICCM frame ICCM23, and then acquires the information retained in the port management table 42 from the line card LC (steps S1007 and S1008). Here, the management card MC2 acquires the information that a predetermined ring port is in the block state BK and the block factor thereof is the SF from the line card LC (step S1008).

The management card MC2 shifts the ring state to the protection state in accordance with the acquired block factor (SF) (step S1009). Then, the management card MC2 recognizes the open/block information of each ring port based on the acquired information retained in the port management table 42, and issues the suspension release instruction to the line card LC at the time of shifting to the ring state in accordance with the block factor when the ring port is in the block state (step S1010). The suspension release instruction can be stored in, for example, the ICCM frame. The line card LC releases the control suspension state in accordance with the suspension release instruction (step S1011).

Note that the management card MC2 which has shifted the ring state to the protection state in the step S1009 stores the block instruction and the block factor (SF) in the ICCM frame ICCM24 transmitted first after the shift to the protection state. Although the suspension release instruction and the ICCM frame ICCM24 are separated in FIG. 21, the suspension release instruction can be stored together in the ICCM frame ICCM24.

By providing the control suspension state as described above, it is possible to prevent the case where the ring port is changed from the block state BK to the open state OP before the management card newly changed to the active card correctly recognizes the open/block state of each ring port and the ring state based on the ring protocol. Accordingly, the creation of the loop path which causes a problem particularly in the ring network can be prevented more reliably.

Meanwhile, even when the line card LC is in the control suspension state, the change from the open state OP to the block state BK is permitted because it does not cause the creation of the loop path. Therefore, in such a case where the management card newly changed to the active card detects the SF before issuing the suspension release instruction, the management card issues the block instruction of the ring port to the line card LC, and the line card LC permits the block instruction. As a result, it is possible to block the target ring port early in the occurrence of fault.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, although the case where the ring protocol defined by the ITU-T G.8032 is used as the ring protocol of the relay system has been described here, the ring protocol is not always limited to this, and another ring protocol can be applied in the same manner and the same effects can be achieved in some cases.

What is claimed is:

1. A relay device comprising:
- a line card having a ring port connected to a ring network; and
- a plurality of management cards which manage the line card,
- wherein the plurality of management cards include an active card operating in an active state and a standby card operating in a standby state and changed to the active card in accordance with a predetermined change instruction,
- the active card determines open or block of the ring port in accordance with an event based on a ring protocol, issues an open instruction or a block instruction of the ring port to the line card, and notifies a block factor representing the event to be that is a basis of the block instruction in addition to the block instruction when issuing the block instruction,
- the line card includes:
- a port control unit which controls open and block of the ring port in accordance with the open instruction and the block instruction from the active card; and
- a port management table which retains open/block information of the ring port and the block factor notified from the active card,
- the standby card acquires information retained in the port management table from the line card when the standby card is changed to the active card in accordance with the predetermined change instruction,
- when the standby card is changed to the active card in accordance with the predetermined change instruction, the standby card sets a ring state based on the ring protocol to a pending state, and
- when the block factor is contained in the information retained in the port management table acquired from the line card, the standby card shifts the ring state to a predetermined ring state from the pending state by internally generating an event in accordance with the block factor.

2. The relay device according to claim 1,
- wherein the block factor includes a factor representing that a fault occurs at the ring port and a factor representing that the ring port is a blocked port of the ring network by default.

3. The relay device according to claim 1,
- wherein the ring protocol is a ring protocol defined by ITU-T G.8032.

4. The relay device according to claim 3,
- wherein the block factor is determined from FS (Forced Switch), SF (Signal Fail), MS (Manual Switch) and RB (RPL Blocked).

5. The relay device according to claim 1,
- wherein the line card further includes: a management card selecting unit which, when a control frame for controlling the ring network is received at the ring port, transmits the control frame to the active card, and does not transmit the control frame to the standby card.

6. The relay device according to claim 1,
- wherein when the standby card is changed to the active card, the standby card acquires the information retained in the port management table from the line card and then issues a suspension release instruction to the line card, and
- the port control unit of the line card shifts to a control suspension state in which control of the ring port from the block to the open is prohibited in accordance with the predetermined change instruction, and releases the control suspension state in accordance with the suspension release instruction.

7. A relay system comprising a plurality of relay devices constituting a ring network,
- wherein at least one of the relay devices includes:
- a line card having a ring port connected to the ring network; and
- a plurality of management cards which manage the line card,
- the plurality of management cards include an active card operating in an active state and a standby card operating in a standby state and changed to the active card in accordance with a predetermined change instruction,
- the active card determines open or block of the ring port in accordance with an event based on a ring protocol, issues an open instruction or a block instruction of the ring port to the line card, and notifies a block factor representing the event to be that is a basis of the block instruction in addition to the block instruction when issuing the block instruction,
- the line card includes:
- a port control unit which controls open and block of the ring port in accordance with the open instruction and the block instruction from the active card; and
- a port management table which retains open/block information of the ring port and the block factor notified from the active card,
- the standby card acquires information retained in the port management table from the line card when the standby card is changed to the active card in accordance with the predetermined change instruction, when the standby card is changed to the active card in accordance with the predetermined change instruction, the standby card sets a ring state based on the ring protocol to a pending state, and when the block factor is contained in the information retained in the port management table acquired from the line card, the standby card shifts the ring state to a predetermined ring state from the pending state by internally generating an event in accordance with the block factor.

8. The relay system according to claim 7, wherein the block factor includes a factor representing that a fault occurs at the ring port and a factor representing that the ring port is a blocked port of the ring network by default.

9. The relay system according to claim 7, wherein the ring protocol is a ring protocol defined by ITU-T G.8032.

10. The relay system according to claim 9, wherein the block factor is determined from FS (Forced Switch), SF (Signal Fail), MS (Manual Switch) and RB (RPL Blocked).

11. The relay system according to claim 7, wherein the line card further includes: a management card selecting unit which, when a control frame for controlling the ring network is received at the ring port, transmits the control frame to the active card, and does not transmit the control frame to the standby card.

12. The relay system according to claim 7, wherein when the standby card is changed to the active card, the standby card acquires the information retained in the port management table from the line card and then issues a suspension release instruction to the line card, and the port control unit of the line card shifts to a control suspension state in which control of the ring port from the block to the open is prohibited in accordance with the predetermined change instruction, and releases the control suspension state in accordance with the suspension release instruction.

* * * * *